United States Patent
Nariyambut Murali et al.

(10) Patent No.: US 11,734,786 B2
(45) Date of Patent: *Aug. 22, 2023

(54) LOW- AND HIGH-FIDELITY CLASSIFIERS APPLIED TO ROAD-SCENE IMAGES

(71) Applicant: Ford Global Technologies, LLC., Dearborn, MI (US)

(72) Inventors: Vidya Nariyambut Murali, Sunnyvale, CA (US); Madeline Jane Schrier, Palo Alto, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,282

(22) Filed: Sep. 16, 2021

(65) Prior Publication Data

US 2022/0004807 A1 Jan. 6, 2022

Related U.S. Application Data

(63) Continuation of application No. 16/444,301, filed on Jun. 18, 2019, now Pat. No. 11,200,447, which is a (Continued)

(51) Int. Cl.
*G06V 10/764* (2022.01)
*G06T 1/20* (2006.01)
(Continued)

(52) U.S. Cl.
CPC .............. *G06T 1/20* (2013.01); *G06F 18/285* (2023.01); *G06V 10/454* (2022.01);
(Continued)

(58) Field of Classification Search
CPC ............... G06V 10/454; G06V 20/582; G06V 30/19113; G06V 10/87; G06V 10/764;
(Continued)

(56) References Cited

U.S. PATENT DOCUMENTS 7,545,965 B2 * 6/2009 Suzuki .................. G06T 7/0012
382/128
9,129,190 B1 * 9/2015 Ranzato .................. G06V 10/82
(Continued)

FOREIGN PATENT DOCUMENTS

| CN | 103150713 | * 12/2015 |
| EP | 3493149 | * 6/2019 |
| KR | 19990086856 A | 12/1999 |

*Primary Examiner* — Shaghayegh Azima
(74) *Attorney, Agent, or Firm* — David R. Stevens; Stevens Law Group

(57) ABSTRACT

Disclosures herein teach applying a set of sections spanning a down-sampled version of an image of a road-scene to a low-fidelity classifier to determine a set of candidate sections for depicting one or more objects in a set of classes. The set of candidate sections of the down-sampled version may be mapped to a set of potential sectors in a high-fidelity version of the image. A high-fidelity classifier may be used to vet the set of potential sectors, determining the presence of one or more objects from the set of classes. The low-fidelity classifier may include a first Convolution Neural Network (CNN) trained on a first training set of down-sampled versions of cropped images of objects in the set of classes. Similarly, the high-fidelity classifier may include a second CNN trained on a second training set of high-fidelity versions of cropped images of objects in the set of classes.

20 Claims, 11 Drawing Sheets

Related U.S. Application Data continuation of application No. 14/995,134, filed on Jan. 13, 2016, now Pat. No. 10,373,019.

(51) Int. Cl.
| | |
|---|---|
| *G06V 10/44* | (2022.01) |
| *G06V 20/58* | (2022.01) |
| *G06V 10/70* | (2022.01) |
| *G06V 30/19* | (2022.01) |
| *G06F 18/20* | (2023.01) |
| *G06V 10/82* | (2022.01) |

(52) U.S. Cl.
CPC ............ *G06V 10/764* (2022.01); *G06V 10/82* (2022.01); *G06V 10/87* (2022.01); *G06V 20/582* (2022.01); *G06V 30/19113* (2022.01); *G06T 2207/30252* (2013.01)

(58) Field of Classification Search
CPC ............ G06K 9/4628; G06K 9/00818; G06K 9/6227; G06K 9/6274; G06T 1/20; G06T 2207/30252; G06F 18/285
See application file for complete search history.

(56) References Cited

U.S. PATENT DOCUMENTS

| | | | |
|---|---|---|---|
| 9,380,280 B2* | 6/2016 | Jang | G11B 20/1217 |
| 10,373,019 B2* | 8/2019 | Nariyambut Murali | G06V 10/764 |
| 11,200,447 B2* | 12/2021 | Nariyambut Murali | G06N 3/045 |
| 2008/0285849 A1* | 11/2008 | Lu | G06V 40/162 |
| | | | 382/166 |
| 2011/0255741 A1* | 10/2011 | Jung | G06V 20/58 |
| | | | 382/103 |
| 2012/0274781 A1* | 11/2012 | Shet | G06T 7/277 |
| | | | 348/169 |
| 2014/0177908 A1* | 6/2014 | Shieh | G06V 10/955 |
| | | | 382/103 |
| 2015/0139485 A1* | 5/2015 | Bourdev | G06V 10/454 |
| | | | 382/103 |
| 2016/0140436 A1* | 5/2016 | Yin | G06F 18/2431 |
| | | | 706/20 |
| 2016/0210525 A1* | 7/2016 | Yang | G06V 10/32 |
| 2016/0232401 A1* | 8/2016 | Hoyos | G06V 40/1353 |
| 2017/0083752 A1* | 3/2017 | Saberian | G06V 10/764 |

* cited by examiner

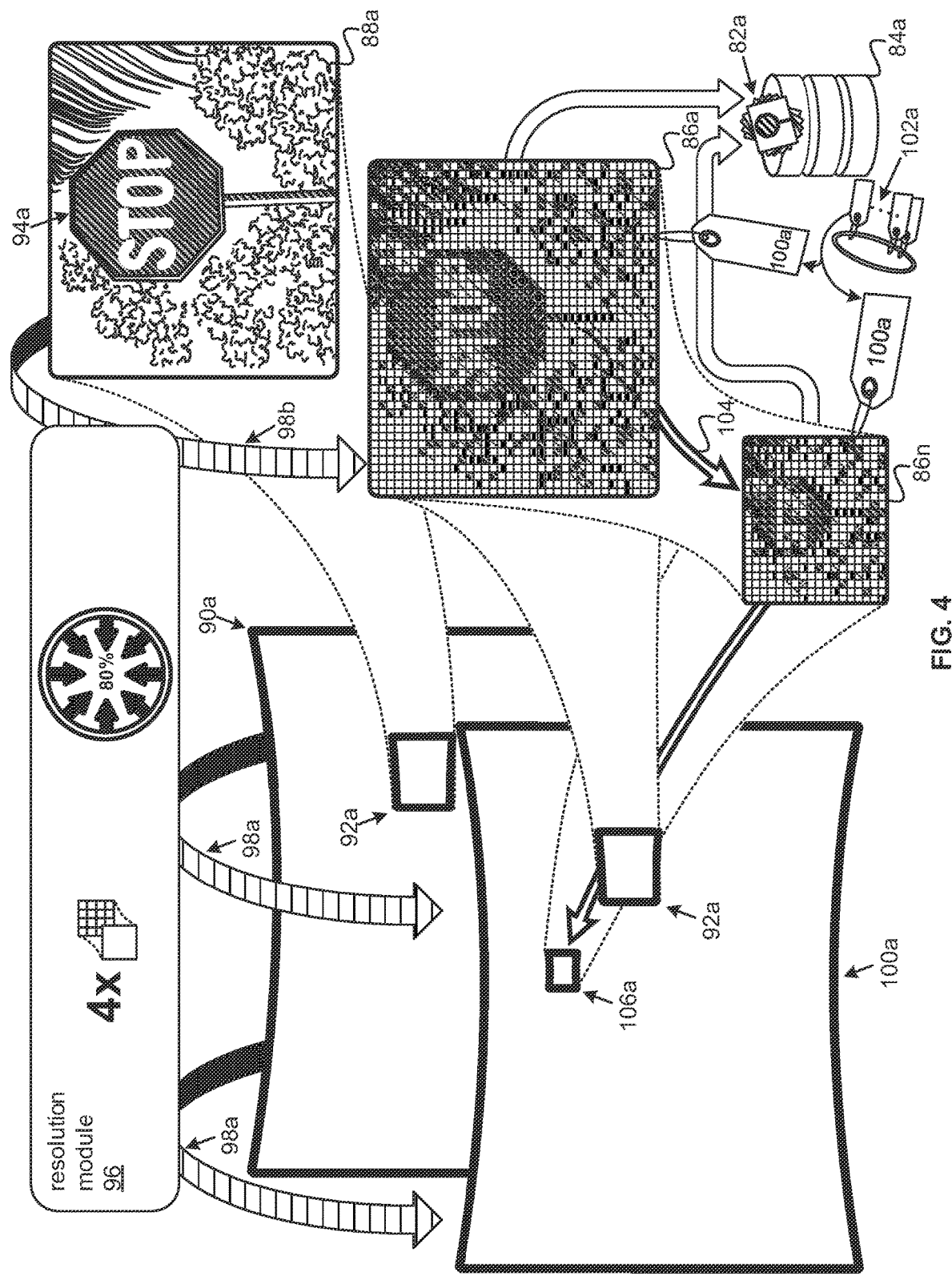

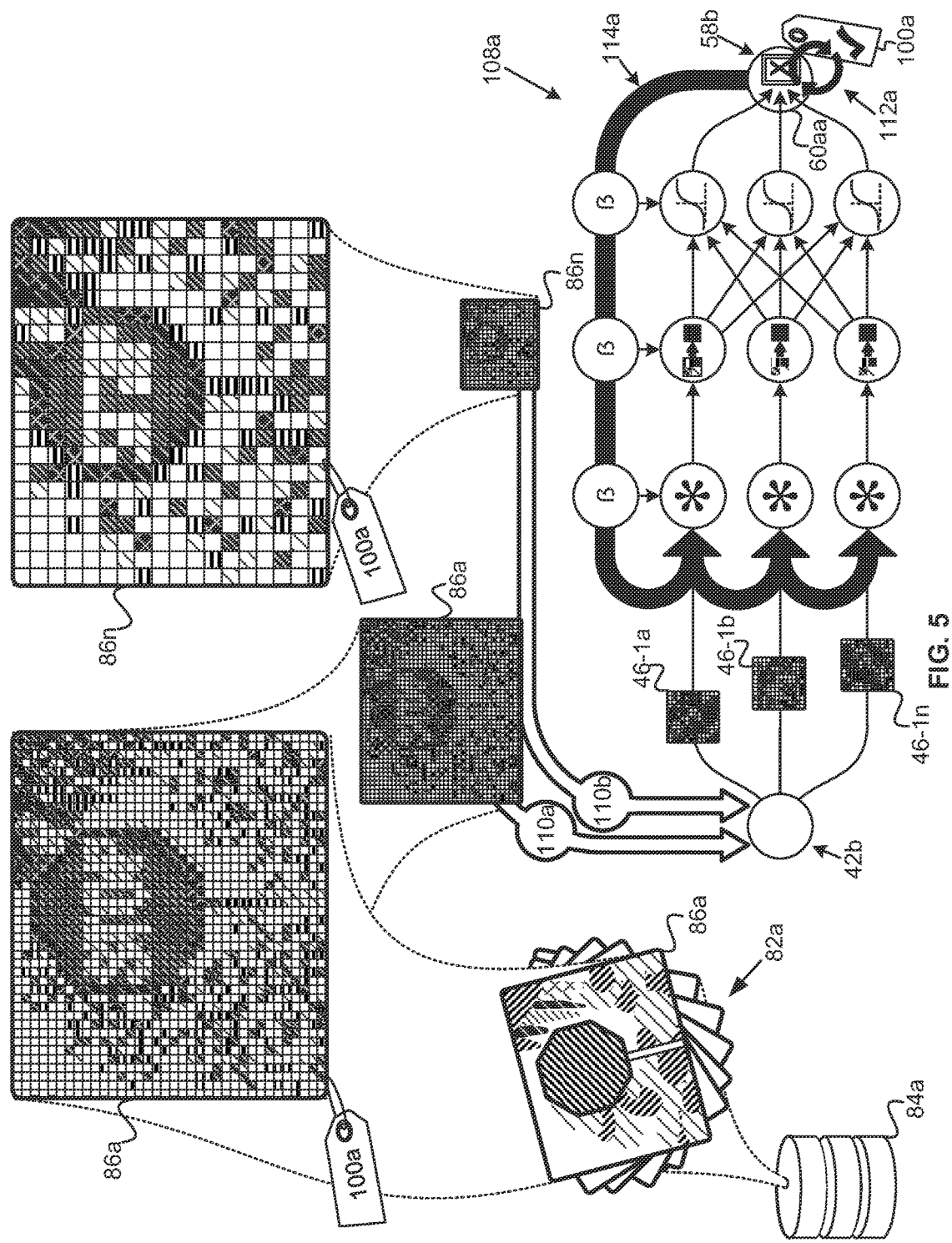

LOW- AND HIGH-FIDELITY CLASSIFIERS APPLIED TO ROAD-SCENE IMAGES

CROSS REFERENCE TO RELATED PATENT APPLICATION(S)

This application is a continuation of and claims the benefit of and priority to U.S. patent application Ser. No. 16/444,301, filed Jun. 18, 2019, which is a continuation of and claims the benefit of and priority to U.S. patent application Ser. No. 14/995,134, filed Jan. 13, 2016, the entire contents of which are expressly incorporated by references.

FIELD OF THE INVENTION

This invention relates to image processing systems and, more particularly, to object classification, detection, and/or locating systems for images of road scenes.

BACKGROUND OF THE INVENTION

The promises and potential of assisted driving and autonomous driving technologies rely on an ability to quickly and accurately classify, detect, and/or locate oncoming and/or surrounding objects. Various technologies that have been brought to bear to provide quick and accurate classification, detection, and/or location information include Radio Detection And Ranging (RADAR) subsystems and Light Detection And Ranging (LIDAR) subsystems, Sound Navigation and Ranging (SONAR) subsystems, and image analysis techniques. With respect to image analysis techniques, a camera mounted on a vehicle may capture images of oncoming and/or surrounding road and/or environment scenes for digital processing.

Over the years, improvements in the techniques applied for image analysis, such as the use of Convolutional Neural Networks (CNNs), have made impressive gains in the accuracy of image analysis. However, techniques, such as the use of CNNs, can be computationally intense both to develop and to deploy, raising problems for the requirements to quickly and accurately provide classification, detection, and/ or location information and/or to flexibly and responsively improve analysis techniques. Innovations able to maintain gains in accuracy while successfully managing computation needs could be capitalized upon to improve analyses development. Additionally, such innovations could better bring gains in accuracy to assisted and autonomous driving for purposes of providing detection, classification, and/or location information and/or providing redundancy to and/or filling in gaps in similar information provided by other technologies.

BRIEF DESCRIPTION OF THE DRAWINGS

In order that the advantages of the disclosures will be readily understood, a more particular description will be rendered by reference to specific embodiments illustrated in the appended drawings. Understanding that these drawings depict only typical examples and are not, therefore, to be considered limiting in scope, the invention will be described and explained with additional specificity and detail through use of the accompanying drawings, in which:

FIG. 4 is a schematic block diagram depicting the creation of a low-fidelity dataset of cropped, labeled, images of classified objects with which to train a low-fidelity classifier, implementing a CNN, as a first stage in a multi-stage image analysis system, in accordance with examples;

FIG. 5 is a schematic block diagram depicting the training of the low-fidelity classifier with the low-fidelity dataset of images of differing scales and resolutions, in accordance with examples;

DETAILED DESCRIPTION

It will be readily understood that the components of the present invention, as generally described and illustrated in the figures herein, can be arranged and designed in a wide variety of different configurations. Thus, the following more detailed description, as represented in the figures, is not intended to be limiting in scope, as claimed, but is merely representative of certain examples. The presently described examples will be best understood by reference to the drawings, wherein like parts are designated by like numerals throughout. In some cases, particular instances of an element in a figure may be identified with an identification number followed by a letter, where the letter may change from figure to figure for the same identification number, indicating differing instances of the element with the same or varying attributes. References to such elements by number only in the specification may refer more generally to a class of such elements and/or a representative instance of the class.

Figure 1:
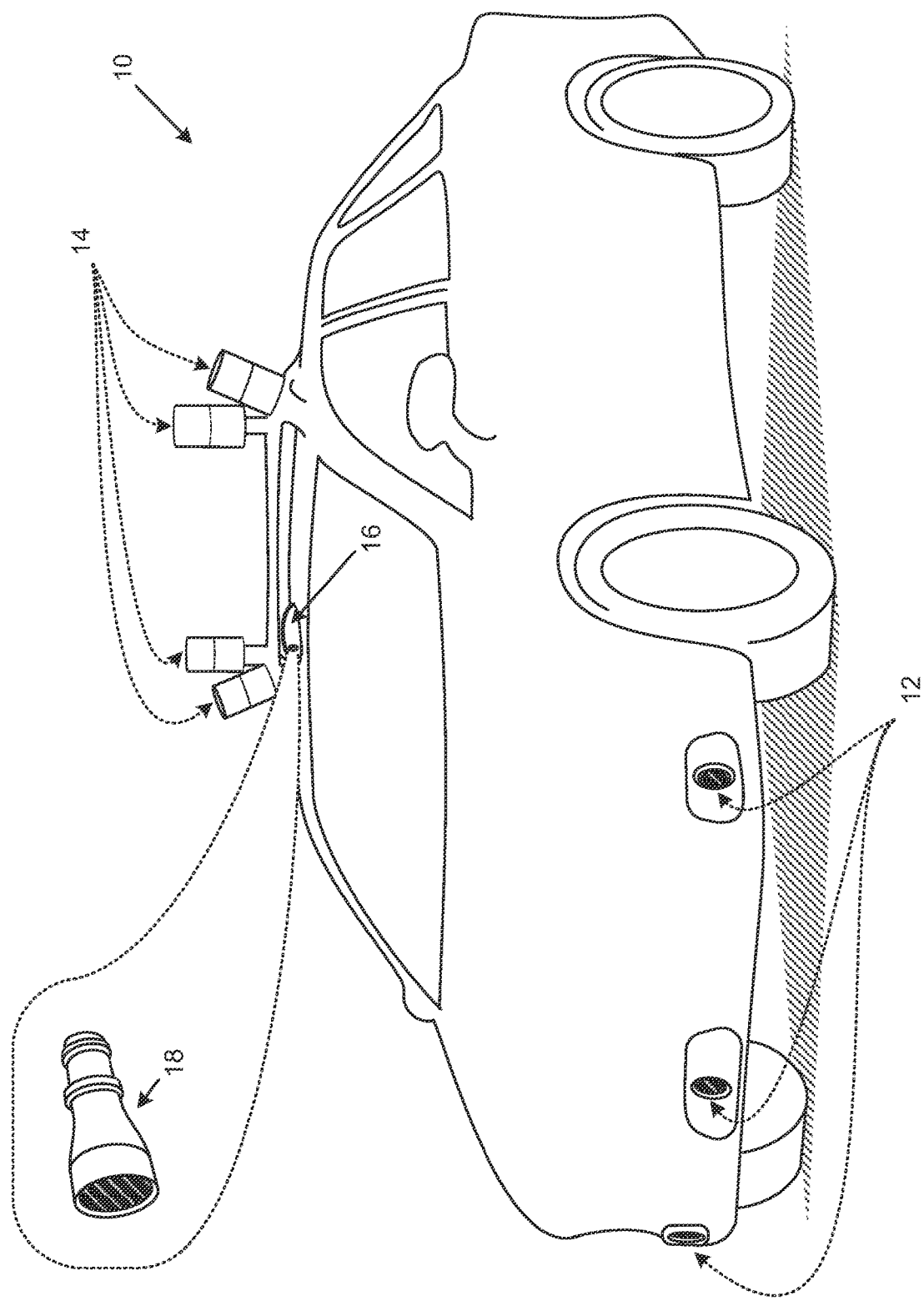
FIG. 1 is a depiction of an automobile equipped with various technologies for capturing information used in assisted and/or autonomous driving technologies, including a camera for capturing images of oncoming road scenes, in accordance with examples.

Referring to FIG. 1, an automobile 10 is depicted. However, the disclosures herein may also be applied to other vehicles 10. The vehicle 10 may be equipped with various types of instruments capable of sensing and recording signals reflecting various objects, signs, signals and/or the like that may be relevant to driving the vehicle 10. Non-limiting examples of such equipment may include a RAdio Detection And Ranging (RADAR) subsystem 12 and a LIght Detection And Ranging (LIDAR) subsystem 14. Either the RADAR subsystem 12, the LIDAR subsystem 14, or both, potentially with additional subsystems, may be part of a broader imaging subsystem. As can be appreciated, the vehicle 10 may be outfitted with other such equipment, such as a SOund NAvigation and Ranging (SONAR) subsystem. Additionally, the vehicle 10 is equipped with a camera 16.

Although a single camera 16 is depicted near the leading edge of the roof of the vehicle 10, any number of cameras 16 may be mounted at any of a number of locations—for example and without limitation, on the dashboard of the vehicle's interior—to capture images of oncoming road-scenes and/or the surrounding environment. Such a camera 16 may be a digital camera with a digital image sensor, such as, without limitation, a Charge-Coupled Device (CCD) and/or Complementary Metal-Oxide-Semiconductor (CMOS). Furthermore, the camera 16 may be a video camera capable of capturing images at a frame rate.

In some examples, the frame rate may exceed fourteen frames per second, potentially by many frames per second, to provide images of sufficient recency to allow for responses to information in the images characteristic of assisted and/or autonomous driving technologies. Additionally, the camera 16 may be responsive to a variety of wavelengths both inside and outside of the visible range and/or may capture color information together with the images it captures. As depicted in the exploded view of the interior of the mounted camera device 16, the camera may be provided with an optical system 18, such as, without limitation, a monocular system of lenses controlling focus, field of view, magnification, and/or similar parameters.

Images captured by such cameras 16 may be analyzed to render information, such as information classifying, detecting, and/or locating objects depicted in such images that are relevant to assisted and autonomous driving systems. In some examples, this information may be combined with information from other subsystems, such as, without limitation, a RADAR subsystem 12 and/or a LIDAR subsystem 14, to provided redundancy, fill in gaps, and/or improve statistical accuracy. Additionally, or in the alternative, such information from a camera 16 may be used on its own for purposes of informing assisted and/or automated driving systems. However, before such information is applied in driving systems, it may be extracted from the images by processing.

Figure 2:
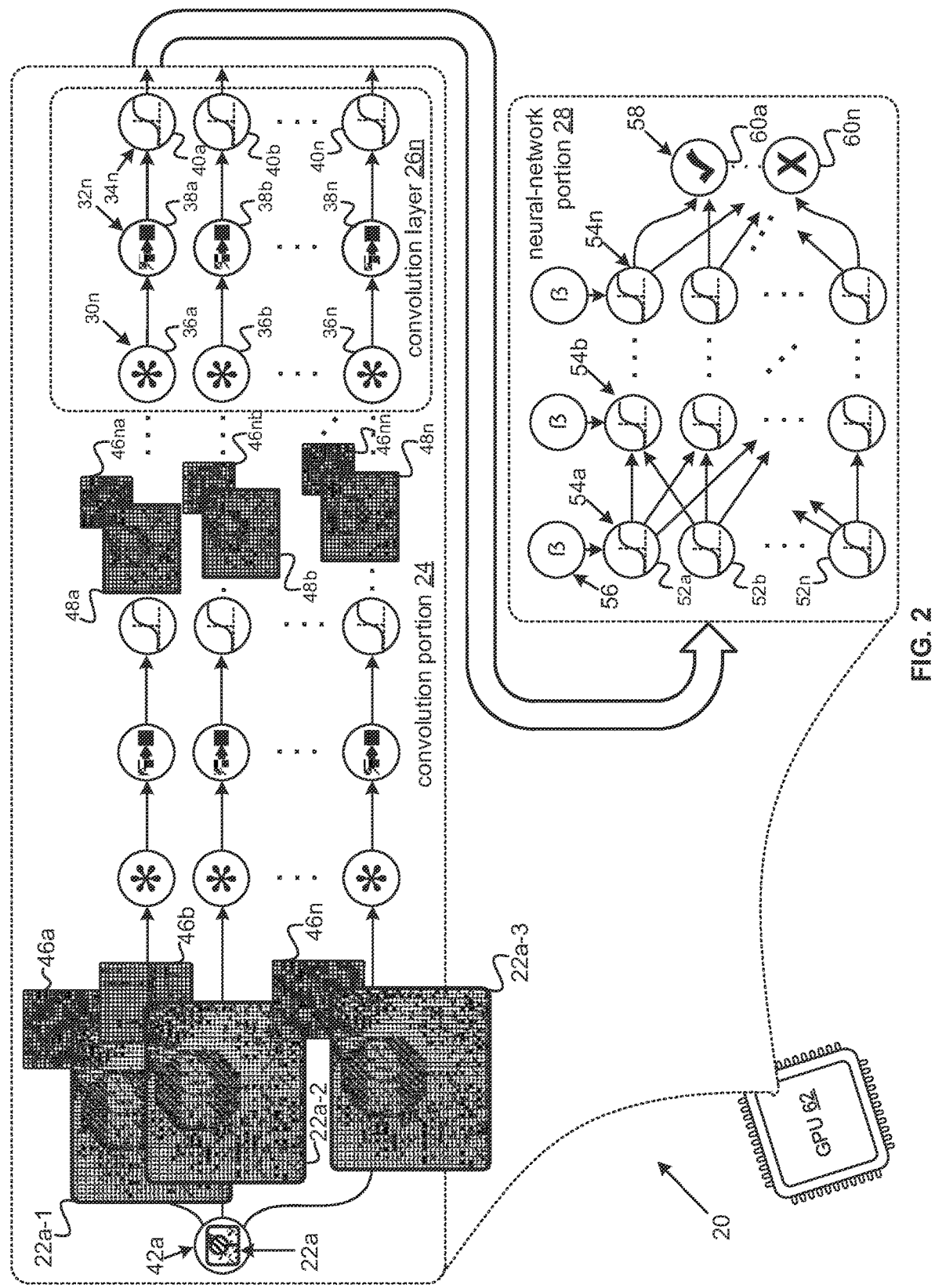
FIG. 2 is a schematic block diagram depicting an example of forward-feed in a Convolution Neural Network (CNN), in accordance with examples.

Referring to FIG. 2, the use of a Convolution Neural Network (CNN) 20 to process images 22a from the camera 16 is depicted. Although several different approaches, from rule-based approaches to different types of machine-learning approaches, have been applied to image analysis, the most accurate to immerge in recent years have involved the use of CCNs 20. An example CNN 20 is depicted in FIG. 2 at various stages of processing a digital, or digitized, image 22a from a camera 16.

The CNN 20 may be subdivided between a convolution portion 24, with one or more convolution layers 26a-n, and a neural-network portion 28. A convolution layer 26n in the convolution portion 24 may include one or more sublayers. Examples of such sublayers may include, without limitation, a convolution sublayer 30n, a subsample sublayer 32n, and/or a non-linear sublayer 34n, not necessarily in the proceeding order. Normalization layers provide an additional non-limiting example of such sublayers. Each of a convolution sublayer 30n, a subsampling sublayer 32n, and a non-linear sublayer 34n, may, respectively include one, but typically more than one, convolution neuron/node 36a-n, non-linear neuron/node 38a-n, and/or subsampling neuron/node 40a-n.

By way of explaining a forward-feed in the convolution portion 24, an exemplary image 22a is depicted. The image 22a processed by the CNN 20 provides a low-resolution depiction of a stop sign, an important object to be classified, detected, and/or located for purposes of assisted and/or autonomous driving. The image 22a may be provided to an input layer 42a of the CNN 20.

For ease of explanation, a simple gray-scale image 22a is depicted with black and white cross hatching. In additional examples, an image 22 may have multiple channels, as would be the case with colored images. For example, and without limitation, the image 22 may be a Red-Green-Blue (RGB) image 22, or an image 22 encoded for a YUV color space. In such examples, an individual image 22 may be considered as a three dimensional matrix, with the first two dimensions assigned to the rows and columns of pixels and a third dimension assigned to the color channels. As can be appreciated, a third dimension could also be used for other types of information, such as stereoscopic information where multiple cameras 16 are used to capture a road scene from multiple angles.

With respect to the first convolution layer 26a, at the first convolution sublayer 30a, a different, individual, first-layer filter, or kernel, 46a-n for each of convolution neurons/nodes 36a-n in the first sublayer 30a, with dimensions for its two-dimensional weights/values smaller than those of the dimensions of the image 22a, may be convolved with the image 22a-n. Example numbers of neurons/nodes 36a-n may include, without limitation, values from four to forty. During the training process for the CNN 20, each filter 46a-m may come to approximate one or more features of objects in the set of classified objects for which the CNN 20 is being trained. Since convolution can be used to determine the similarity between functions, by convolving the image 22a with a first-layer filter 46, a feature map may be produced indicating the various degrees to which features represented in the first-layer filter 46 are present in different regions of the image 22a.

Although different forms of convolution may be applied at convolution neurons/nodes 36a-n, in some examples consistent with the gray-scale image 22a depicted in FIG. 2, each weight/value in a first-layer filter 46a-n may be multiplied by the underlying values used to render the image 22a on which it is overlaid and the products may be summed in a single cell in a resultant feature map. Hence, each pixel in the resultant feature map may be viewed as the dot product of a portion of the image 22 of dimensions equal to those of the first-layer filter 46a-n applied thereto.

After the dot product of the first-layer filter 46a-n and the first portion of the image 22a is calculated, convolution may proceed by sliding, either horizontally, vertically, or both by one or more pixels, the first-layer filter 46 relative to the underlying image 22a and computing another dot product with respect to the new corresponding portion of the image 22a, which will overlap the first portion. A corresponding convolution neuron/node 36 may continue to calculate dot products, ordering them in the rows and columns of the resultant feature map until the first-layer filter 46 has been applied across the entire underlying image 22a, or matrix 22a where the image 22 includes multiple information channels. Consequently, without padding, and if the first-layer filter 46a-n is slid only one pixel for each dot product, the resultant matrix will have its first two dimensions equal to those of the underlying image/matrix less the dimensions of the first-layer filter 46 plus one in each dimension.

Consequently, the small first-layer filter 46, relative to the dimensions of the image 22a, can capitalize on the relatively high local signal correlation in images 22, without being burdened with the low correlation over large distances. Additionally, since the small first-layer filter 46 is slid over the image 22a, the ability to recognize features is position invariant. By providing multiple first-layer filters 46a-n, feature maps may be produced for several different features. In examples in which the image 22 has multiple image channels, resulting in a three, or more, dimensional matrix, first-layer filters 46a-n, as well as subsequent layer filters 46na-nn may also be provided with a third dimension, or more. Such three-dimensional filters 46 may provide an individual two-dimension filter for each image channel of the image 22.

In some examples, a non-linear sublayer 32a may be included to apply a non-linear function to values in the matrix produced by the convolution sublayer 30a. The resultant non-linearities allow additional convolution layers 26b-n to make contributions, which could not be made if the feed-forward process were purely linear. Non-limiting examples of such a function that may be applied include a sigmoid function and/or a hyperbolic tangent function.

Subsampling neurons/nodes 40a-n in the first subsampling sublayer 34a may also be applied. In some examples, such neurons/nodes 40a-n may be operable to implement max-pooling, whereby a set of cells from a resultant matrix is replaced by a single cell having a value equal to the maximum value for cells in the set of cells. However, other forms of pooling, such as, without limitation, average pooling may be implemented. The number of cells pooled into a single cell may include, without limitation, four to one, nine to one, sixteen to one, and so on. Not only may a subsampling sublayer 34 be used to reduce storage, but it may also provide local invariance and resilience to perturbation.

A set of convolved, non-linearly mapped, and subsampled feature maps 48a-n downstream from the first convolution layer 26a, with smaller dimensions than those of the original image 22a are depicted in FIG. 2. At this point, the CNN 20 may provide the advantages of deep learning by including multiple convolution layers 26a-n. These convolution layers 26a-n may be arranged hierarchically such that successive filter 46 at convolution sublayers 30 may be determined by the presence of higher and higher level, or more abstract, features.

With respect to the activation of neurons/nodes between convolution layers 26, feature maps 48 resulting from a previous convolution layer 26 may activate convolution neurons/nodes 36 in a subsequent convolution layer 26. In some examples, each feature map 48 from a previous convolution layer 26 may activate an individual convolution neuron/node 36 at a subsequent convolution layer 26. Additionally, or in the alternative, after the first convolution layer 26a, resultant feature maps 48 may be combined in a subsequent convolution layer 26.

Such combinations may be performed at single convolution neurons/nodes 30, wherein the corresponding filter 46, which may have at least three dimensions, one of which describing a number of feature maps 48 being combined. Such filters 46 may be thought of as having a volume. Dimensions beyond three, may be used, for example and without limitation, for attributes such as image channels. Resulting feature maps 48 combining previous feature maps, may depict the degree to which features from various previous filters 46 may be conjoined within different regions of the image 22. Where resultant feature maps 48 from a previous convolution layer 26 are combined, all of the feature maps 48 from a previous layer 26 may be combined in a subsequent feature map 48 and/or one or more subsets of the previous feature maps 48 may be combined in one or more subsequent feature maps 48. In many examples, it may be helpful to expand the number of convolution neurons/nodes 36 in a subsequent convolution layer 26. However, for some subsequent convolution layers 26 it may also be helpful to reduce the number.

The number of convolution layers 26 may vary, with non-limiting example numbers including numbers two through twenty, potentially making the convolution portion 24 a deep network. As processing progresses through convolution layers 26, the resulting feature maps 48 may become smaller and smaller, approaching the size of the filters 46 with which they are convolved. Eventually, in some examples, either the height, width, or both dimensions of an iteration of feature maps 48 may equal those of the filters 46 to which they are applied, resulting in scalars and/or vectors. Also, in some examples, a subsampling sublayer 32 may result in scalars or vectors. Such scalars and/or vectors may be the output of the convolution portion 24 and the input to the classifier/neural-network portion 28

As with the convolution portion 24, the number of layers 54a-n, which may be referred to as hidden layers 54a-n, may vary, with non-limiting example numbers including numbers two through twelve. Also, as with the non-linear sublayers 34 in the convolution portion 24, the hidden layers 54a-n in the neural-network portion 28 may apply a non-linear function. Within the neural-network portion 28, two adjacent sublayers 54 may be fully connected, such that the output of each neural/node 52 in the first sublayer 54a may be duly weighted and communicated to activate each neuron/node 52 in the second sublayer 54b.

In such examples, the weight/value applied to the input of each neuron/node 52 in the second sublayer 54b may depend on the originating neuron/node 52 in the first sublayer 54a, the neuron/node 52 in the second sublayer 54b being activated, and/or both. Additionally, a bias weight/value 58 may be applied to one or more sublayers 54. In some examples, one or more bias values 58 may also be applied in one or more convolution layers 26. Consequently, a progression from one layer 54 to another layer 54 in the classifier portion 28, may result in a non-linear, weighted sum, to which a bias value 58 may be added, at each neuron/node 52 in the subsequent layer 54. In addition, or in alternative to fully connected layers 54, layers 54 may also be connected in other ways, such as, without limitation, with a Gaussian style connection.

The result of processing by the neural-network portion 28 may be recorded in an output layer 58. The output layer 58, may provide a number of output nodes 60a-n, where each output node 60 provides a probability value indicating a probability that the image 22a depicts an object, sign, signal, or the like classifiable within a corresponding category/class from a set of classes/categories for which the CNN 20 is trained, or for which the CNN 20 is being trained. For example, the output neuron/node 60a assigned to the class/category for stop signs displays a check symbol, symbolic of a probability value indicative of the image 22a depicting a stop sign, whereas, the 'x' in the other output neuron/node 60n indicates that an object pertaining to that output neuron/node 60n is probably not depicted.

As can be appreciated, the number of calculations involved in the forward feed on a CNN 20 is quite large. Fortunately, most of the calculations are simple multiplication and summation operations performed on floating point values. Additionally, many of these operations can be performed in parallel. Consequently, in some examples, a CNN 20, with its large number of floating point operations, may be favorably implemented on one or more Graphic Processing Units (GPUs) 62, which may have one or more cores, to take advantage of the parallel processing and high FLoating-point Operations Per Second (FLOPS) capabilities of such processors. However, the computational intensity of a CNN 20 may increase greatly when, in addition to providing classification functionality, a CNN 20 is used to provide detection and/or locating functionalities, as discussed in greater detail with respect to the following figure.

Figure 3B:
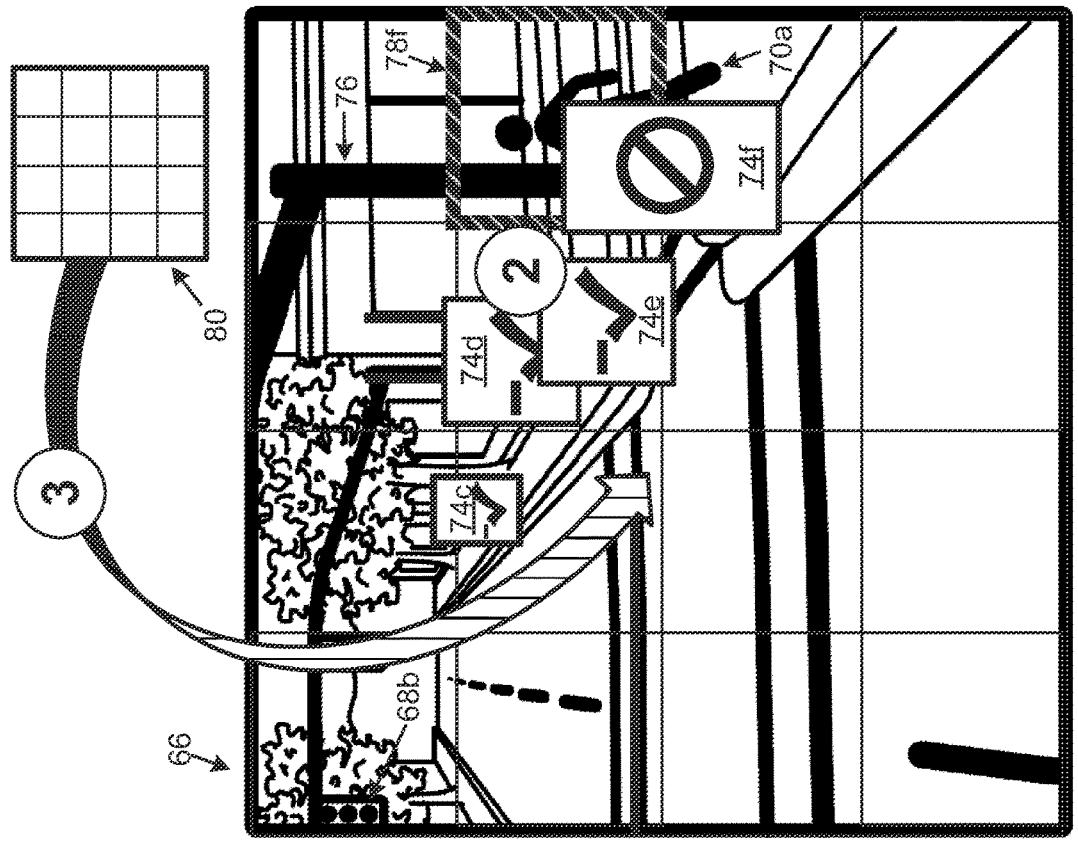
FIG. 3B is a schematic block diagram depicting a selective approach using context information in applying a CNN that skips over portions of the image to which the CNN is applied to reduce computations and time, in accordance with the prior art.
Figure 3A:
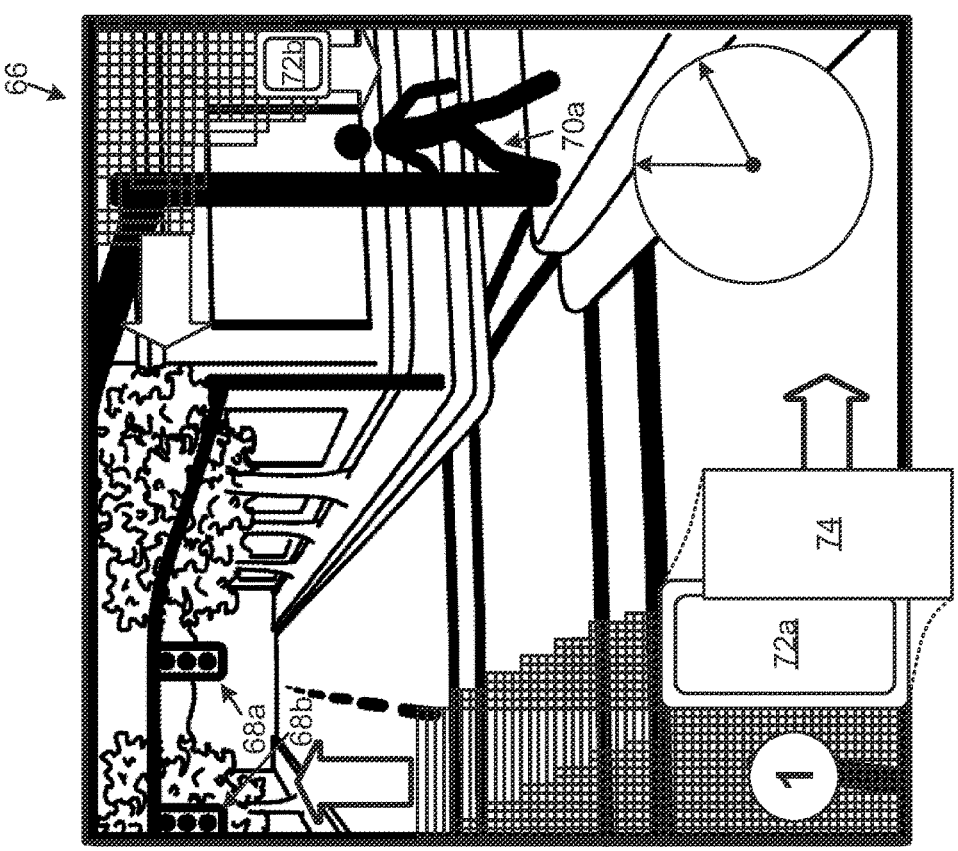
FIG. 3A is a schematic block diagram depicting a lengthy, exhaustive, sliding-window approach to applying a CNN to an image, together with a segmenting-grid approach used to reduce implementation time, in accordance with the prior art.

Referring to FIG. 3A, a portion 66 of an image of a road scene is depicted. However, unlike the image 22a being processed in FIG. 2, in which the classifiable object, i.e., the stop sign, dominates the image, classifiable objects of interest in the portion of the image 66 include traffic lights 68a-b and the pedestrian 70a, which occupy a much smaller sectors of the image portion 66. Consequently, the signal from such classifiable objects may be overcome by other elements in the image, when processed as a whole, and/or not otherwise detected.

Furthermore, for the purposes of an assisted and/or automated driving system, not only the detection and/or classification of an object are important, but also the location of the object within an image. For example, whether a pedestrian 70 is within and/or approaching an oncoming portion of the pathway of the vehicle 10 for which the image is captured, or remains safely on the periphery, may be of paramount importance. However, with respect to a single input image, the architecture of the CNN 20 has a track record of accuracy for detection and classification of objects dominating an image, but the design of the CNN 20 is ill suited to locate objects. The very positional invariance of the filters 46 tiled in an overlapping manner across an impute image, which are so helpful to classification, obscure an objects relative location in an image.

A first approach, denoted by the circled number 1, that has been applied to overcome such limitations in locating objects is to apply a sliding window 72a over an image, as depicted with respect to the portion 66 of the image depicted in FIG. 3A. Such a window 72 extracts and/or abstracts the sector 74 of the image over which the sliding window 72 is overlaid. The extracted and/or abstracted sector 74 may then be applied to a CNN 20 for purposes of object detection and/or classification, along the lines of the forward feed described above with respect to FIG. 2.

The sliding window 72a then slides horizontally or vertically, one pixel at a time and then extracts and/or abstracts another sector 74 of the image for processing, such that the subsequent sector 74 overlaps the previous sector 74, as demonstrated by the residual outlines of the sectors 74 on the image. The sliding window 72a continues this process until it has exhaustively covered the image. In this way, regardless of the where in the image an object may be located, it may be detected and classified. Furthermore, by sliding pixel by pixel, as opposed to placing the window 72a at the opposite side of its previous boundary, the depiction of an object sliced by such a boundary will not be missed. Also, by keeping track of the coordinates of the abstracted sectors 74 applied to a CNN 20, the relative location in an image of an object detected and classified can be obtained from the coordinates of the sector 74 in which the object is detected.

As can be appreciated, applying each overlapping sector 74 individually to a CNN 20 can increase the already computationally intense operations of processing an image with a CNN 20 by orders of magnitude. The large computational increases can further be highlighted upon consideration that the portion 66 of the image depicted in FIG. 3A likely does not make up the entire image of the road scene. Furthermore, since the scale at which classifiable objects may be detected will diminish or increase based on the distance of the object relative to the camera 16, according to the laws of perspective, it is often necessary to apply multiple windows 72a-n of different sizes, each of which extracting its own set of sections 74 to be processed individually.

For, example, while the first window 72a depicted in FIG. 3A may be large enough to detect and classify the pedestrian 70a, it may be too large to detect and classify the traffic lights 68a,b. A second window 72b may be applied to detect the traffic lights 68a,b, but would be too small to detect the pedestrian 70a. Hence, multiple windows 72a-n may need to be applied.

Therefore, this first approach, albeit thorough, is not only computationally intense, but very time consuming, as indicated by the clock icon. Conversely, the human eye and brain can process the gist of a road scene in under a tenth of a second, giving a human driver time to react and/or to respond to objects in a road scene. Assisted and/or automated driving systems also need to acquire information on such time scales in order to respond to rapidly approaching objects of significance in an oncoming road scene. Processing fifteen to thirty images per second, of which only a portion 66 is depicted in FIG. 3A, according to the first approach is not feasible for meeting the needs of assisted and/or automated driving systems.

Referring to FIG. 3B, a second approach, indicated by the circled number two, is depicted. According to this second approach, contextual information is relied upon to reduce the locations from which, the densities at which, and/or the scales for which sections 74a-n are extracted and/or abstracted from an image for application to a CNN 20. For example, the number and/or different scales of sectors 74 extracted and/or abstracted from an image may be greatly reduced in an upper region of an image, which would often be occupied by the sky. Additionally, such an approach may focus on the region directly in front of the vehicle, or just off to the side, giving reduced attention to regions more to the periphery.

However, although this second approach may greatly speed up image processing, it does so at an unacceptable cost of leaving many gaps in the field of view of an image for false negatives, i.e., incorrect determinations that objects are not present when they in fact are. For example, the upper portion of a road scene may be important where a car is headed downhill, resulting in portions of the image that would normally be devoted to the sky depicting the road ahead. By way of another example, portions of the periphery that may not be important for objects approaching slowly from the side may be very relevant where the objects are approaching rapidly from the side. Several other examples may arise upon further reflection.

Also, even where such a contextual approach abstracts and/or extracts a section 74 for application to a CNN 20 that depicts a classifiable object, the size of the extracted portion may be insufficient and/or may not be correctly positioned to abstract a sufficient amount of the depicted region. For example, FIG. 3B depicts a series of sections 74c-f that may be abstracted from the image portion 66 for which contextual information, derived, for example and without limitation, from previous image processing and/or relative positions in the image portion 66, indicates correspond to an adjacent lane or an abutting curb and sidewalk. Processing of the first three sections 74c-e correctly indicate the absence of pedestrians, as indicated by the check-mark symbols and minus signs.

However, the right-most section 74f results in a false negative, as indicated by the barred circle. The right-most section 74f not only appears to be a too small to capture the region of the image portion 66 depicting the pedestrian, but is also ill positioned so as not to capture the head, chest, back arm, and back leg of the pedestrian. Classification within the right-most section 74f is further complicated by the presence of the traffic light post 76. Whereas a correctly sized and positioned image would result in a positive detection and classification of the pedestrian 70a in the correct location, the second approach results in a dangerous false negative. Even if the second approach were able to detect and classify the pedestrian 70, the ill positioned sector 74f would have provided misleading location information.

Although the second approach in FIG. 3B may speed up the processing rate of images to provide classification, detection, and/or locating information quickly enough to allow for response, it does so at with an unacceptable cost to accuracy. The pedestrian 70a may have been detected by, for example, a LIDAR subsystem 14. However the camera 16 and imaging system would fail to provide the requisite redundancy and or ability to provide completeness and to fill in gaps of other subsystems 12, 14 requisite to achieve the levels of statistical certainty required by assisted and/or automated driving systems.

Also with respect to FIG. 3B, a third approach is depicted in which an image, or portion 66 thereof, is divided into different grid cells 78 by applying a grid 80 thereto. The grid 80 applied to the image portion 66 in FIG. 3A includes four rows and four columns, resulting in sixteen grid cells 78. In the third approach, grid cells 78 may completely span an image so that the image is considered in its entirety. Also, in this third approach, the outputs 60 in the output layer 58 of a CNN 20 may be equal to the number of grid cells 78, with each output 60 indicating whether a pedestrian 70 is present in the corresponding grid cell 78. During image processing, grid cells 78 can be processed simultaneously to speed up processing, with different filters 46 applied to different grid cells 78. By applying a fully-connected layer in a neural-network portion 28 of the classifier, the output 60 for one grid cell 78 may be informed by contextual information for other grid cells 78.

During training, as opposed to using a cropped image of an object that the network may be trained to classify, detect, and/or locate, in approaches similar to the third approach, training occurs on images of larger environments in which one or more classifiable objects, such as pedestrians, may occupy only a fraction of the training images, fitting within one or more grid cells 78. Such images are labeled both in terms of the classifiable objects that they may depict and which grid cell(s) 78 in which they are depicted. Additionally, overhead may be involved in generating differently labelled datasets by shifting and/or reconfiguring images in the original training dataset so that the classifiable objects therein may appear in different grid cells 78.

When applied to test images, the grid cells 78 for which the corresponding outputs 60 indicate the presence of classifiable objects may be used as candidates to be applied to one or more additional classifiers. A secondary classifier, applied to a single grid cell 78, may be trained with images, including cropped images dominated by classifiable objects. Such training images may be labeled in accordance with the classifiable object they depict, requiring a different system of classification labels.

Also, the third approach is problematic where objects, such as the pedestrian 70 lie at the intersection of grid cells 78. For example, while the eighth grid cell 78f covers much of the depicted pedestrian 70a, it also truncates the pedestrian 70a by excluding the legs of the pedestrian 70a. Such incongruities between grid cells 78 and depicted objects cause problems for the classification, detection, and/or the locating of objects. As another example of a problem depicted in FIG. 3B, if the classifiable object depicted, such as the pedestrian 70a, is of a different scale, such as the pedestrian 70a that extends outside of the eighth grid cell 78f, the classifier may not be well trained for classifying, detecting, and locating the depicted object.

Therefore, new approaches are needed to leverage the newly achieved accuracy of CNNs 20 to improve assisted and/or autonomous driving. Such approaches need to be simultaneously accurate, exhaustive, and provide classification, detection, and location information at speeds allowing for timely responses for assisted and/or autonomous driving. Such approaches, should perform with equal reliability regardless of the relative position and/or scale of the depiction of a classifiable object. The approaches should be trainable with low overhead and training times susceptible to fine tuning, despite the large numbers of training images used train to acceptable levels of accuracy.

By way of providing a brief overview of exemplary approaches to addressing these requirements, hierarchical, multi-stage approaches may be implemented. Stages in such approaches may include both a low-fidelity classifier and a high-fidelity classifier. The low-fidelity classifier may be implemented on a set of processors, also referred to herein as a processer set. As used herein, the terms set and subset may include any number of elements, including a single element. The low-fidelity classifier may be operable to select one or more candidate regions, from a set of overlapping regions, also referred to herein as a region set, spanning a down-sampled version of an image.

The image may be provisioned from an automobile-affixed camera 16 capturing road-scenes. The low-fidelity classifier may select one or more candidate regions upon determining the candidate regions(s) depict a classified object, such as a pedestrian 70 or traffic sign, for which the low-fidelity classifier is trained. Such multistage approaches may also include a high-fidelity classifier, which also may be implemented on the processer set.

The high-fidelity classifier may be operable to verify classified-object depiction in one or more patches. The patch(es) may be mapped from the candidate region(s), selected by the low-fidelity classifier, to a high-fidelity version of the image. The high-fidelity classifier may also be trained to classify, detect, and/or locate the classified object, but with higher fidelity. The high-fidelity classifier may, therefore, verify a classified depiction in a patch mapped from a candidate region, where the high-fidelity classifier indicates the depiction.

In such approaches, the low-fidelity classifier may include a first CNN 20 that is trained with a down-sampled training set. The down-sampled training set may include multiple, labeled, down-sampled versions of images of objects in a class characterizing the classified object. The labeled, down-sampled versions may have dimensions commensurate to dimensions of regions in the region set. Similarly, the high-fidelity classifier may include a second CNN 20. This second CNN 20 is trained with a high-resolution training set comprising multiple, labeled, high-fidelity versions of images of objects in the class.

In some examples, at least some of the down-sampled versions in the down-sampled training set may be down-sampled to a lowest resolution at which entropies in the down-sampled versions remain above a threshold defined relative to entropies in the original images of objects in the class. In some, but not necessarily all such examples, the predetermined percent of entropy may come from a range centered on eighty percent and extending above and below eighty percent by five percent.

With respect to test images, as opposed to the images used to train the first and second CNNs 20, in some examples, a down-sample module may also be implemented on the processor set. The down-sample module may be operable to produce the down-sampled version of the image from the automobile-affixed camera 16 at a down-sample factor. In such examples, the down-sample factor may be determined to preserve, in the down-sampled version, a predetermined percent of entropy in the image from camera.

Additionally, or in the alternative, some examples may include a window module, which may be implemented on the processor set. The window module may be operable to abstract overlapping regions from the down-sampled version of a test image. Such overlapping regions may have dimensions as can be framed by a window slid fully across the down-sampled version, for purposes of generating the region set. The window module and/or the low-fidelity classifier may then apply the overlapping regions of the region set to the low-fidelity classifier. With respect to the high-fidelity classifier, some examples may include a mapping module operable to map one or more candidate regions from the down-sampled version of the image to one or more patches of the high-fidelity version of the image. As a result, the candidate region and the patch may cover a common sector of the image in the down-sampled version and the high-fidelity version respectively.

As can be appreciated, much of the structure and functionalities discussed with respect to elements disclosed herein, may be provided by modules. Modules may take the form of an entirely hardware embodiment, an entirely software embodiment (including firmware, resident software, micro-code, etc.), or an embodiment combining software and hardware aspects. Furthermore, aspects of the presently discussed subject matter may take the form of a computer program product embodied in any tangible medium of expression having computer-usable program code.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by, or in connection with, the instruction execution system, apparatus, or device.

Computer program code for carrying out operations of the present invention may be written in any combination of one or more programming languages, including an object-oriented programming language such as C++, and conventional procedural programming languages, such as the "C" programming language, or similar programming languages. Aspects of a module that are implemented with software may be executed on a micro-processor, Central Processing Unit (CPU) and/or the like. Any hardware aspects of the module may be implemented to interact with software aspects.

As can be appreciated, the foregoing overview is not exhaustive of innovations involved in such approaches. Several additional aspects of such approaches are discussed below. A dataset used in such new approaches for purposes of training a low-fidelity classifier is discussed in further detail with respect to the following figure.

Referring to FIG. 4, aspects of a first dataset 82a, stored at one or more databases 84a, are depicted for the training of a first stage in multi-stage, hierarchical approaches that satisfy the requirements discussed above. A database 84 may be stored on one or more physical storage mediums, such as, but without limitation, those discussed herein below. This first stage may be a low-fidelity classifier implemented as a CNN 20. The first dataset 82a, also referred to herein as a down-sampled training set 82a and/or a down-sampled set 82a, may be made up of versions 86 of images objects.

The down-sampled training set 82a may include multiple, cropped, labeled, down-sampled images/versions 86a-n of images 88a-n depicting objects in a set of classes for which the low-fidelity classifier is being trained to perform classification, detection, and/or location functions. In FIG. 4, relative dimensions of a field of view of a training image 90a relative to a section 92a, region 92a, or zone 92a, of a cropped portion 88a, which is expanded for purposes of illustration, of the road-scene image 90a depicting a classified object 94a, namely, a stop sign 94a. In some examples, cropping may be achieved by framing the classified object 94 within a training image 90 to dominate the image 90.

Also depicted in FIG. 4, is a resolution module 96 operable to down-sample 98a the training image 90a, and/or down-sample 98b the cropped portion 88a. In the example depicted in FIG. 4, the resolution module 96 may down-sample 98 by a factor of four with respect to each dimension. However, as can be appreciated, the factor with respect to a given dimension, or both dimensions, may vary.

By way of providing an example of guidance for determining such factors, the down-sampled images 86a-n in the first dataset 82a may include fully down-sampled images 86 that are down-sampled 98 to a limit resolution. The resolution module 96 may apply and/or calculate the limit resolution as a lower limit on resolution capable of maintaining at least a predetermined percentage of entropy relative to an original, cropped image 88a from which a corresponding down-sampled image 86a/n is generated. In some examples, this limit resolution may depend on the size, or scale, for which a cropped image 88 is being down sampled.

In other words, methods applying the disclosures herein may involve calculating a maximum factor by which the image 88 can be down-sampled to generate a down-sampled image/version 86 while maintaining a ratio of entropy in the down-sampled image/version 86 to entropy in the original image 88 above a predetermined threshold level and/or maintaining an absolute value of entropy, which may be scale dependent. As indicated by the down-sampling icon, with arrows radiating inward from a circular perimeter, in some, but not necessarily all such examples, the predetermined percent of entropy may come from a range centered on eighty percent and extending above and below eighty percent by five percent.

Additionally, for purposes of training, each cropped, down-sampled image 86*a-n* may be labeled with a corresponding label 100*a-n* classifying the depicted object 94. Although all of the labels 100*a* in FIG. 4 identify the same class, i.e., stop signs, the labels 100*a* may come from a broader, label set 102*a*. This broader label set 102*a* may include labels 100 for several different classes of objects 94 in a broader set of detection classes. Examples of such classes may include pedestrians 70, different types of pedestrians 70 (such as children), animals, vehicles, traffic signs, road markings, curb boundaries, and/or any other objects that may be pertinent to the decision processes of assisted and/or automated driving systems.

Hence, collecting a training set of images 82*a*, may involve collecting a set of images 88 depicting pedestrians 70 in various positions and contexts for inclusion within the set of images 82*a*. In such examples, images labeling the training set 82*a* may be done according to a common class in the set of detection classes. In as much as classified objects 94, which may be depicted at different relative distances, may be depicted at different sizes, the low-fidelity classifier, and/or high fidelity classifier may be trained with different image, or version, sizes, or scales, for one or more classes of objects in the set of detection objects. Collecting a training set of images 82 may include cropping a set of images 88 of classified objects 94 at a set of one or more image sizes for different classes and/or within the same class of the set of detection classes. Hence, FIG. 4 depicts the cropping of down-sampled images/versions 86*a/n* at different image sizes, or scales.

Different image sizes, or scales may correspond to different resolutions. Consequently, in some examples, different image/versions 86 may be generated for different version/image sizes, or scales, for a common detection class by further down sampling 104 to further decrease resolution. FIG. 4 depicts a first down-sampled version 86*a*, which is further down sampled 104 to produce a further down-sampled version 86*n* of the cropped image 88*a*. The further down-sampled version 86*n* may stand in for a depiction of the same stop sign 94*a* depicted at a new portion 106*a* of the down-sampled image 100*a*, corresponding to a greater relative distance from the camera 16 and correspondingly diminished by the laws of perspective.

Referring to FIG. 5, the use of the low-fidelity dataset 82*a* to train a low-fidelity classifier 108*a* is further explained. The low-fidelity classifier 108*a* may comprise a CNN 20*a*. The low-fidelity classifier 108*a* is simply symbolic of a low-fidelity classifier 108 implemented with a CNN 20 and is depicted with only a single convolution layer 26 with a filter depth of only three for ease of illustration. However, in an actual implementation of the low-fidelity classifier 108, all of the possibilities for the CNN 20 discussed with respect to FIG. 2, including the neural-network portion 28, are open to the low-fidelity classifier 108.

The training of the low-fidelity classifier 108*a* may be accomplished with the down-sampled set of labeled images 82*a* and the many cropped, down-sampled, labeled images/versions 86*a-n* therein. The number of cropped, down-sampled, labeled images/versions 86*a-n* may vary from the thousands to the millions. Consequently, previous applications of CNNs 20 for image classification, detection, and/or locating have entailed training times measured in days to weeks, and even many hours on super computers.

The speed with which an image/version 86 may be applied to the low-fidelity classifier 108*a* determines whether different configurations for the low-fidelity classifier 108*a* are feasible and/or whether it is feasible to reconfigure, retrain and/or fine tune the low-fidelity classifier 108*a*. By using down-sampled images/versions 86, the number of computations required to forward feed 110 an image/version 86 to the low-fidelity classifier 108*a* may be decreased by orders of magnitude, from, for example and without limitation, millions to thousands. As a result, the time to apply the dataset 82*a* to the low-fidelity classifier 108*a* can be reduced from weeks to hours, allowing the low-fidelity classifier 108*a* to be implemented with a wider range of possible configurations, retrained and/or fine-tuned to produce more accurate results.

By way of explanation, a first down-sampled image/version 86*a* from the down-sampled set 82*a* may be forward fed 110*a* through the low-fidelity classifier 108*a*, from the input layer 42*b* to the output layer 58*b*. Although only a single output 60*aa* is depicted in FIG. 5, as discussed with respect to FIG. 2, the output layer 58*b* may include any number of outputs 60*aa-an*. Each output 60 may correspond to a different class from a set of classes for which the low-fidelity classifier 108 is being trained. Furthermore, each output 60 may indicate a probability as to whether or not the image/version 86 being forward fed 110 to the low-fidelity classifier 108 depicts a classified object 94 in the class assigned to the output 60.

In the depiction provided in FIG. 5, the first image/version 86*a* has been forward fed 110*a* through the low-fidelity classifier 108*a*. Incorrectly, however, the output 60*aa* assigned to the class of depicted objects 94*a* that are traffic signals, or more particularly, stop signs 94*a*, does not indicate that the first down-sampled image/version 86*a* depicts a stop sign 94*a*. As discussed above, images/versions 86 in the set of images 82*a* may be classified according to a set of detection classes by labels 100 assigned to the images/versions 86.

Consequently, the labels 100 may be leveraged to implement a supervised learning approach to machine learning to train the low-fidelity classifier 108*a*. For example, the incorrect result may be discovered and utilized to further train the low-fidelity classifier 108*a* by comparing 112*a* the output 60*aa*, indicated as not finding a probability of a depiction by the 'x' character, to the label 100*a* corresponding to the first version/image 86*a*. The incorrect result 60*aa* indicates that elements of the low-fidelity classifier 108*a*, such as, without limitation, the filters 46-1*a* to 46-1*n*, the hidden layers 54, and biases 56, require further additional adjustments. Such adjustments can be determined by applying a backward propagation of errors method 114, referred herein as backpropagation 114.

One or more processors, which may include one or more GPUs 62, may implement the backpropagation 114*a* by applying an optimization method across the low-fidelity classifier 108*a* from the output layer 58*b* to the input layer 42*b*. The optimization method may involve a performance function. In some examples, the low-fidelity classifier 108*a* may be trained by minimizing, or maximizing, the performance function, which may be, by way of example and not limitation, one-half the squared difference between the result indicated by the label 100*a* and the actual probability of the output 60*aa*, as in a least-squares approach. In some examples, binary values of one and zero can be assigned to the depiction of the relevant object and the lack of such a depiction, respectively, or vice versa, as indicated by the corresponding label 100.

Since, as discussed with respect to FIG. 2, a smooth, non-linear function 40*a-n*, 52*a-n* may be applied to all weights/values throughout the low-fidelity classifier 108*a*, a derivative of the performance function may be used to indicate the direction and relative amounts by which to adjust the weights/values to minimize the performance function. Hence the optimization method may be implemented as a gradient descent/ascent method, such as a stochastic gradient descent/ascent method. However, the large numbers of adjustable weights/values in the low-fidelity classifier 108*a*, complicate the problem of differentiation due to the high dimensionality of the space for the performance function.

Backpropagation 114 provides an approach for differentiating the performance function in terms of the partial derivatives of the various adjustable weights/values in the low-fidelity classifier 108*a*. In accordance with backpropagation 114, to find the partial derivative of the performance function with respect to a given adjustable weight/value, the chain rule may be applied. In applying the chain rule to find the partial derivative of a given adjustable weight/value, the partial derivative with respect to a given adjustable weight/value is multiplied by the partial derivatives of any inputs leading into the performance function between the given adjustable weight/value and the output 60*aa*.

By working backwards, layer by layer, from the output layer 58*b* toward the input layer 42*b* in calculating the partial derivatives of adjustable weights/values, therefore, backpropagation 114 can reuse the calculations of partial derivatives from the previous layer(s). More specifically, backpropagation 114 can use these calculations of partial derivatives when applying the chain rule and finding the product of all the intervening partial derivatives between the subject adjustable weight/value and the output(s) 60. In other words, backpropagation 114 proceeds by calculating an adjustment, often scaled by a rate factor to prevent significantly overshooting a final answer, for the adjustable weights/values for each neuron/node in a layer.

Backpropagation 114 may begin at a layer closest to the output layer 58*b*, such as a hidden layer 54. Backpropagation 114 may continue by calculating the weights/values for each neuron/node in the next closest layer until the input layer 42*b* is reached. The calculated adjustments may then be applied to their corresponding adjustable weights/values and the performance function recalculated. Backpropagation 114 then iterates through this process until the performance function is sufficiently minimized and/or maximized. Because of the iterative nature of this process, the savings in calculations and time achieved by utilizing down-sampled images/version 86 for training are multiplied for each image/version 86 used in training by the number of iterations required and the number of images/versions 86 in the training set 82*a*.

Whereas each neuron/node in the neural-network portion 28 may involve taking the partial derivative of an action function with respect to a single adjustable weight/value, within convolution sublayers 30 of the convolution portion 24, each neuron/node 36 presents an action function, in terms of its corresponding filter 46, with a multidimensional matrix of variables. When applying backpropagation 114 to a convolution sublayer 30, the partial derivative may be taken of the convolution function with respect to each indexed, adjustable weight/value of the corresponding filter 46.

Once the performance function is minimized, or maximized, another image/version 86*n* may be forward fed 110*b* through the low-fidelity classifier 108*a*, to provide further training. As depicted, another image/version 86*n* may have a different scale. As depicted by the two enlarged instances of the first and second images/versions 86*a/n*, a difference in scale is also a difference of resolution with respect to the depicted, classified object 94*a*.

At first, the various adjustable weights/values in the low-fidelity classifier 108*a* may be selected at random, they may be initialized based on the training of other networks, and/or they may be initialized based on various image processing techniques. Also, in some examples, one or more layers may be determined by an unsupervised learning process. The high-fidelity classifier may be trained in a similar manner, as discussed with respect to the following figure.

Figure 6:
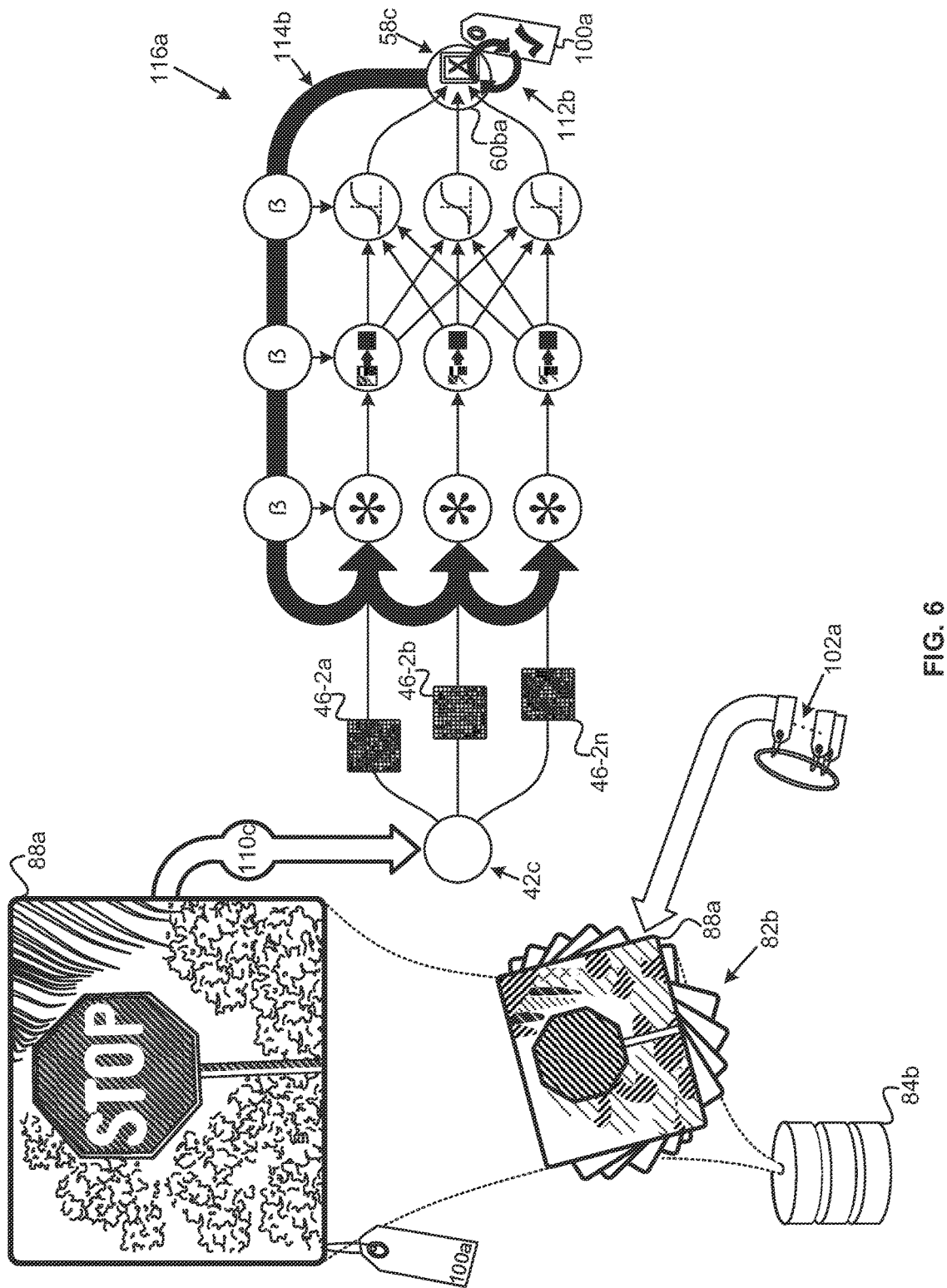
FIG. 6 is a schematic block diagram depicting the training of a high-fidelity classifier serving as the second stage in the multi-stage image-analysis system, the high-fidelity classifier being trained with a high-fidelity dataset of cropped, labeled, high-fidelity images of classified objects, in accordance with examples.

Referring to FIG. 6, a high-fidelity classifier 116*a*, which may serve as the second stage in the multi-stage image analysis system, is depicted in the context of its training. Whereas, the down-sampled images 86*a-n* for which a low-fidelity classifier 108 may be trained, as discussed above, to provide speed and flexibility during the training process and speed and extensive coverage during classifying, detecting, and/or locating objects 94 in a road-scene image in a first stage, a high-fidelity classifier 116 may be trained to provide improved accuracy in a second stage, to achieve an accuracy goal for no, or substantially no, misses and few false alarms. Also, because of the additional accuracy provided by a high-fidelity classifier 116, a low-fidelity classifier 108 may be trained for a high recall, and/or sensitivity, with respect to the candidate region(s) it selects, trusting the high-fidelity classifier 116 to remove irrelevant candidates.

As with the low-fidelity classifier 108*a*, the high-fidelity classifier 116*a* may implement a CNN 20. Also, the high-fidelity classifier 116*a* in FIG. 6 is simply symbolic and is, therefore, only depicted with a single convolution layer 26 with only three filters 46-2*a* to 46-2*n* for ease of illustration. Again, an actual high-fidelity classifier 116 may implement any combination of the possibilities for a CNN 20 discussed with respect to FIG. 2, including a neural-network portion 28. Because of distinct roles played by the high-fidelity classifier 116, details of the architectures for the high-fidelity classifier 116 and the low-fidelity classifier 108 may, or may not, vary.

Additionally, because of its different roles, the high-fidelity classifier 116*a*, with its second CNN 20, may be operable to be trained on a second dataset 82*b*, which may differ from the first dataset 82*a*, used to train the low-fidelity classifier 108*a*. The second dataset 82*b*, also referred to herein as a high-resolution training set 82*b*, or simply as an image set 82*b*, may include images 88*a-n*. These images 88*a-n* may also be cropped. However, these images 88*a-n* may be maintained at higher resolutions, and/or fidelity, relative to the images/versions 86*a-n* in the first dataset used 82*a* to train the low-fidelity classifier 108*a*. In some examples, for which the high-fidelity classifier 116*a* is trained for multiple different sizes and/or scales, the resolution for an image 88 at a smaller size/scale may be less than the resolution of an image/version 86 at a larger scale in the first dataset 82*a*. However, at a common size/scale, images in the second dataset 82*b* may be provided at higher resolutions than those in the first dataset 82*a*.

In some examples, the images 88a-n in the second dataset 82b may include the same images 88a-n used to create the first dataset 82a, but without down sampling 98, and/or with less down sampling 98. Additionally, or in the alternative, the second dataset 82b may include new and different, albeit comparable, images 88 selected for purposes of training the high-fidelity classifier 116a. For purposes of continuity and to enable the high-fidelity classifier to better check the candidate region(s) selected by the low-fidelity classifier 108a, the images 88 in the second dataset 82b may be labeled with labels 100 from the same label set 102a as those used with respect to the first dataset 82a.

Once trained on the second dataset 82b, the high-fidelity classifier 116a may re-classify, relative to the label set 102a, an area of a road-scene image, at high fidelity, covering the section(s), probable zone(s), and/or candidate region(s), selected by the low-fidelity classifier 108a. In this way, the high-fidelity classifier 116a may be used to confirm the depiction of an object 94 classified according to the label set 102a. Because of the increased resolutions, training times for the high-fidelity classifier 116a may increase, but adjustments and fine tuning may still be made with relative ease through the low-fidelity classifier 108a.

For purposes of explaining the training process, an exemplary image 88a from the second dataset 82b is depicted. The second dataset 82b may be stored on the same set of databases 84a, or different set of databases 84b, as the first dataset 82a. The image 88a, as with the images/versions 86a/n discussed in the explanation of the low-fidelity classifier 108a, is labeled with the label 100a for the classifiable object 94 of a stop sign 94a.

The image 88a may be forward fed 110c through the high-fidelity classifier 116a, from the input layer 42c to the output layer 58c, which may provide a probability that the image 88a depicts one or more classifiable object 94 assigned to the one or more nodes 60ba-bn of the output layer 58c As with the low-fidelity classifier 108a, if the difference between the probability and the value indicated by the label 100a is above an acceptable amount, the backpropagation 114b process, as discussed above, may be applied. Backpropagation 114 may be implemented and/or iterated through until any significant difference is resolved. At which point, a next image 88 from the dataset 82b may be forward fed 110 through the high-fidelity classifier 116a, and the process repeated. Again, the number of cropped, labeled images 88a-n may vary from the thousands to the millions.

The higher resolutions in the second dataset 82b, and/or in a candidate sector(s)/zone(s)/region(s), may provide additional information with which to improve the accuracy with which detecting, classifying, and/or locating may be performed on road-scene images. However, since the number of candidate regions from a road-scene image are limited by the low-fidelity classifier 108a, the high-fidelity classifier 116a can be included in a hierarchical multi-stage system without contributing prohibitive amounts of computation and/or time for purposes of assisted and/or autonomous driving applications. Once the low-fidelity classifier 108a and the high-fidelity classifier 116a have been trained, therefore, they may be applied to classifying, detecting, and/or locating classified objects 94 in images for purposes of assisted and/or autonomous driving applications.

Figure 7:
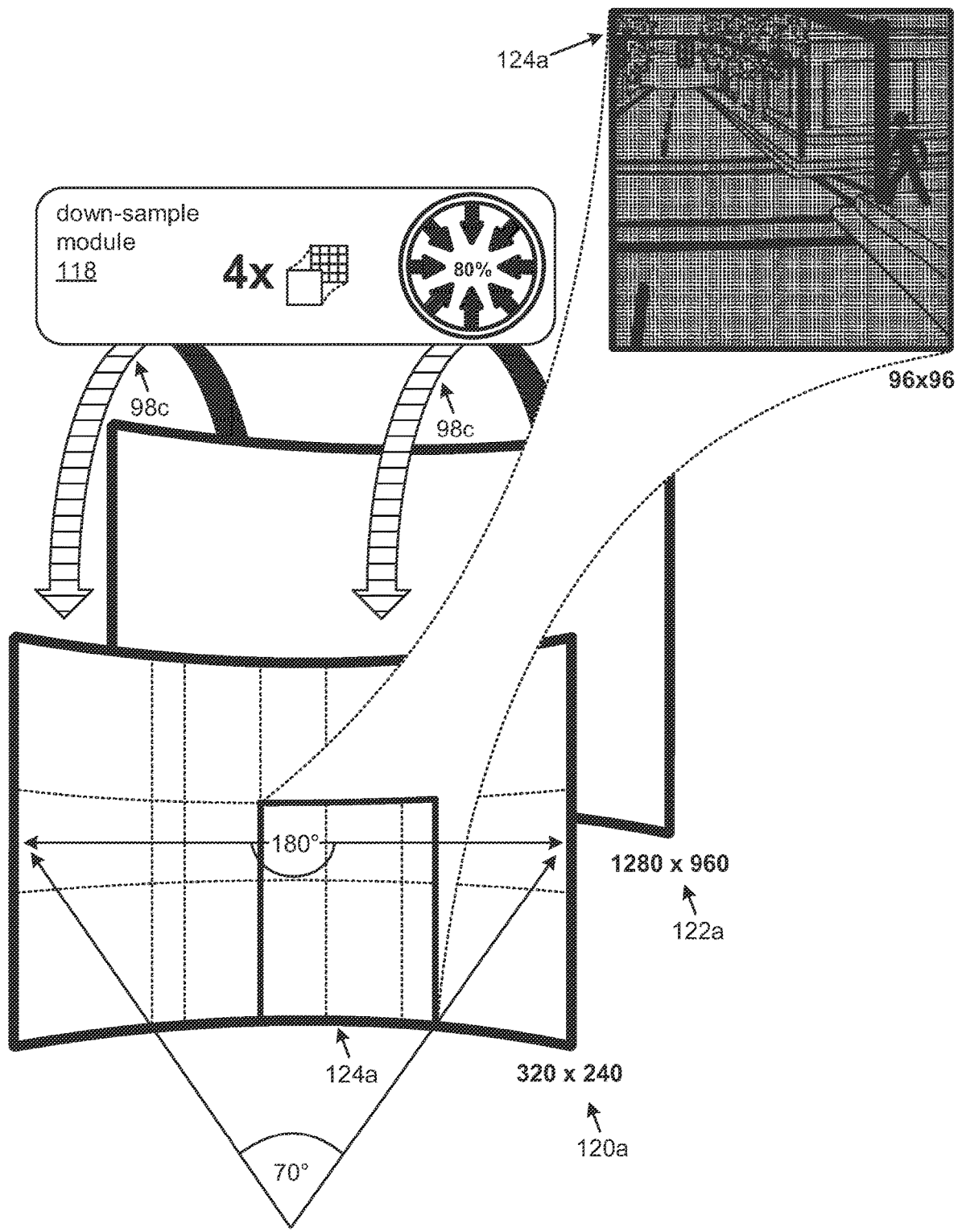
FIG. 7 is a schematic block diagram depicting a down-sample module down-sampling test images of a road-scene for analysis by the image analysis system, in accordance with examples.

Referring to FIG. 7, a down-sample module 118 is depicted. The down sample module 118 may be implemented on the processor set and/or a different processor set. The down-sample module 118 may generate a down-sampled version 120 of an image 122 from an automobile-affixed camera 116 capturing oncoming road-scenes by down-sampling 98 the image 122 to a down-sampled image/version 120 of the image122. Once down-sampled, the down-sampled image/version 120 may be analyzed by the low-fidelity classifier 108a of the image analysis system.

As with the down-sampled training set 82a, the factor, with respect to any or all dimensions, by which the down-sample module 118 may down sample 98c a road-scene image 122a may, may be determined, is some examples, to maintain a predetermined percent, ratio, or absolute value of entropy in the down-sampled version 120a relative to the entropy in the image 122a from the camera 16. Again, the predetermined percent of entropy may come from a range centered on eighty percent and extend above and below eighty percent by five percent. In some examples, the factor(s) may be determined to be as high as possible while maintaining the entropy in the down-sampled version 120a above a predetermined threshold value for a ratio or absolute value.

In the example depicted in FIG. 7, the original road-scene image 122a has resolution dimensions of 1280 by 960, but any number of different resolutions are possible. Because the road-scene image 122a is down sampled 98c by a factor of four, the down-sampled version 120a has a resolution of 320 by 240. Again, however, any number of different down-sampling factors and/or resolutions are possible for the down-sampled version 120a. The down-sampled version 120a may be fed to the input layer 42b of the low-fidelity classifier 108a for the speedy and extensive, and/or exhaustive, preliminary analysis of the field of view captured in both the road-scene image 122a and the down-sampled version 120a.

As indicated, the field of view captured may vary. Possible fields of view defined with angles of view with respect to azimuth of seventy degrees and eighty degrees are indicated in FIG. 7 by way of example and not limitation. Other non-limiting examples can include fifteen degrees and three-hundred-and-sixty degrees. Possible fields of view may also be defined with a similar variety angles of view with respect to a vertical dimension.

Also shown in FIG. 7, is a portion 124a of the down-sampled version 120a depicting some of the oncoming road scene. In some examples, the entire down-sampled version 120a may be fed to the input layer 42b of the low-fidelity classifier 108a as a series of overlapping sub-regions. In other examples, any number of different overlapping portions 124 of the down-sampled version 120a may be fed to different instances of the low-fidelity classifier 108a for simultaneous processing. The different overlapping portions 124 may be overlapped by a number of pixels in each dimension corresponding to the number of cells, in the corresponding dimensions, of the largest filters 46 in the low-fidelity classifier 108a so that the entire down-sampled version 120a may be processed as though it were processed on a single instance of the low-fidelity classifier 108a and without segmentation, such as the segmentation in prior art approaches discussed with respect to FIG. 3B. The portion 124a depicted is of dimensions ninety-six pixels by ninety-six pixels, but any number of different dimensions are possible.

Figure 8:
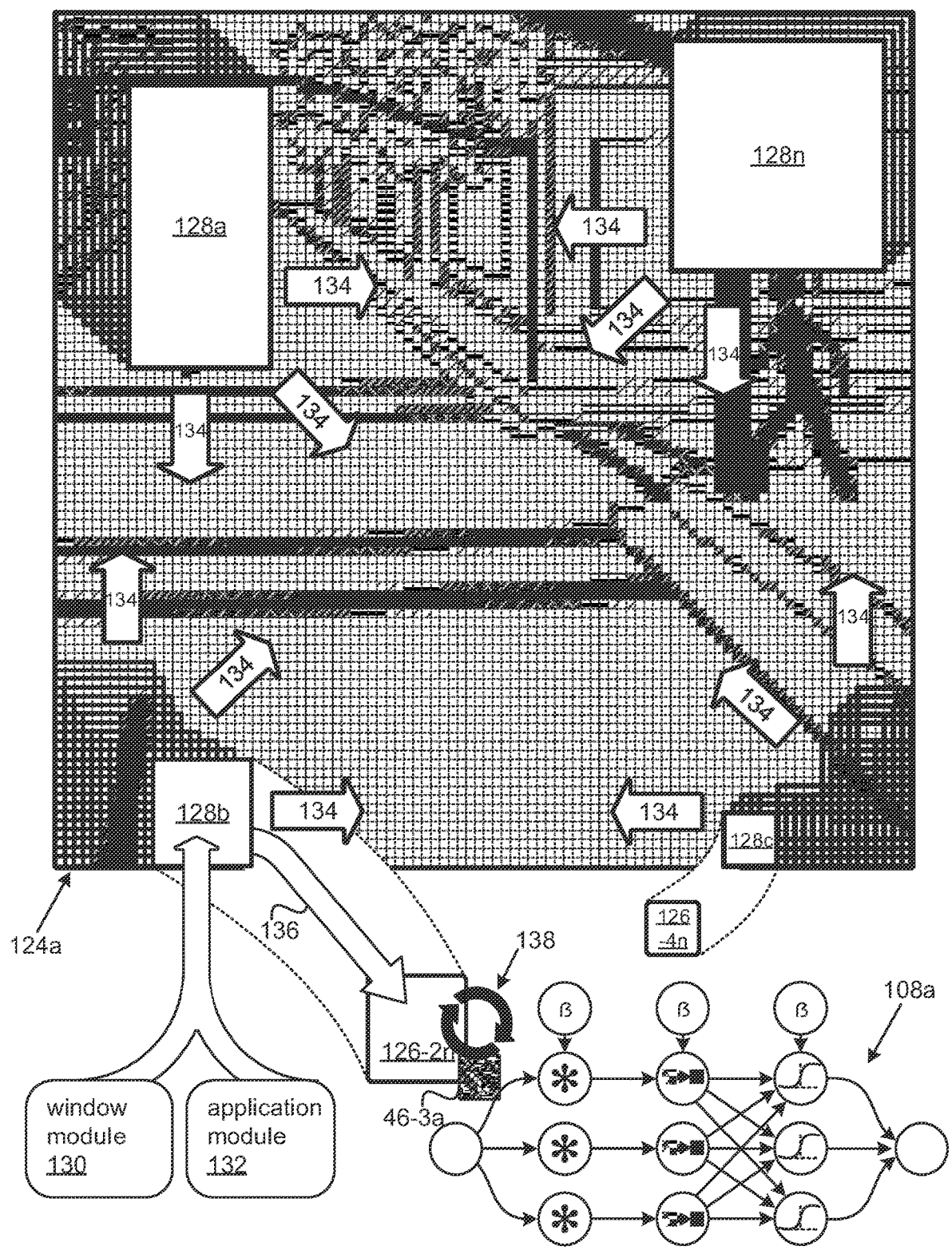
FIG. 8 is a schematic block diagram of the application of sliding windows of various scales to a down-sampled portion of a road scene to abstract segments of the portion of the image for application to a low-fidelity classifier, in accordance with examples.

Referring to FIG. 8, the extraction of a set of overlapping zones 126-1a to 126-1n, 126-2a to 126-2n, 126-3a to 126-3n, 126-4a to 126-4n, also referred to herein as sections and/or regions, covering the down-sampled version 120a is depicted. For ease of illustration, the portion 124a of the down-sampled version 120a is depicted instead of the entire down-sampled version. Nevertheless, the portion 124a of the down-sampled version 120a can be viewed as representative of the entire down-sampled version 120a for purposes of discussion.

The overlapping zones 126-1a to 126-1n, 126-2a to 126-2n, 126-3a to 126-3n, 126-4a to 126-4n may be definable by one or more sliding windows 128a-n with dimensions equal to dimensions of different groups of the overlapping zones 126-1a to 126-1n, 126-2a to 126-2n, 126-3a to 126-3n, 126-4a to 126-4n. Some examples may include a window module 130 and/or an application module 132 either on the same processor set as the low-fidelity classifier 108a or another processor set. The window module 130 may be operable to abstract overlapping regions 126-1a to 126-1n, 126-2a to 126-2n, 126-3a to 126-3n, 126-4a to 126-4n, from the down-sampled version 120a, as can be framed by at least one window 128a-d slid 134 fully across the down-sampled version 120a, for a region set, also referred to herein as a set of overlapping zones, a set of overlapping sections, and/or a set of scaled zones.

The window module 130 may apply 136 the overlapping regions 126-1a to 126-1n, 126-2a to 126-2n, 126-3a to 126-3n, 126-4a to 126-4n to the low-fidelity classifier 108a. Similarly, in alternative examples, the application module 132 may canvass 134 the full field of view captured by the low-resolution image 120a by applying 136 overlapping sections 126-1a to 126-1n, 126-2a to 126-2n, 126-3a to 126-3n, 126-4a to 126-4n of the low-resolution image 120a to the low-fidelity classifier 108a. As each region 126 of the region set is applied 136 to the low-fidelity classifier 108a, it is convolved 138 with filters 46-3a to 46-3n as it is forward fed 110 through the low-fidelity classifier 108a.

To generate a region set to apply 136 to the low-fidelity classifier 108a, the window module 130 and/or application module 132 may slide 134 a window 128 from a first region 126 across the down-sampled version 120a, and/or portion 124a thereof, by a predetermined stride. The stride may be one pixel horizontally, vertically, or both. However, different numbers of pixels per stride are also possible as long as there is sufficient overlap between strides to center a classifiable object 94 in an abstracted region 126 and accurately locate the object 94. In some examples, contextual information may be used to vary the stride in different regions of the down-sampled version 120a and/or portion 124a thereof. A region 126, zone 126, and/or section 126 may be abstracted and/or included in the region set from each position at which the sliding window 128 resides. Hence, the number of sections 126 in the region set for a given window size may be equal to the product of the dimensions of the down-sampled version 120a and/or portion 124a thereof less the corresponding dimensions of the window 128, minus one, in each dimension.

Therefore, down sampling 98 by a factor of four can reduce the number of regions to be applied to the low-fidelity classifier 108a from a road scene image 122a of dimensions 1,280 by 960, where zero padding is applied at image boundaries, from 1,228,800 to 76,000, or two orders of magnitude. If portions 124 of dimensions of ninety-six by ninety-six are applied to multiple instances of the low-fidelity classifier 108a, the number of regions 126 to be applied 136 may be reduced to 9,216. As can be appreciated, such reductions greatly speed the process of classifying, detecting, and/or locating classifiable objects 94. This is particularly true when sliding windows 128a-n of multiple different sizes, or scales, are applied to the down-sampled version 120a and/or portion 124a.

In such examples, a first window 128a may have a first set of dimensions differing from a second set of dimensions for a second window 128b. The first window 128a, second window 128b, and/or additional windows 128c,n, may each be slid 134 across the down-sampled version 120a and/or portion 124a. In such examples, the first dimensions and the second dimensions, and/or the dimensions of any additional sliding windows 128c,n may correspond to different scales at which objects in the set of classes can potentially be depicted and detected in the down-sampled version 120a of the image 122a. In other words, the window module 130 and/or an abstraction module 132 may abstract a set of scaled zones from the down-sampled image 120a, or portion 124a thereof, with scaled zones 126 in the set of scaled zones having differing dimensions from the dimensions of a first sliding window 128a and commensurate with scaled dimensions of a scaled sliding window 128b.

In such examples, the region set may include multiple subsets for differing sizes/scales, such as a first region subset of first overlapping regions 126-1a to 126-1n with dimensions commensurate to the first dimensions and a second region subset of second overlapping regions 126-2a to 126-2n with dimensions commensurate to the second dimensions. Also, in some, but not all of such examples, the down-sampled training set 82a may include a first down-sampled subset of first down-sampled versions 86 having dimensions commensurate to the first dimensions. The down-sampled training set 82a may also include a second down-sampled subset with second down-sampled versions 86 having dimensions commensurate to the second dimensions. As discussed with respect to the following figure, the low-fidelity classifier 108a may select one or more candidate regions, from a region set as potentially depicting a classifiable object 94.

Figure 9:
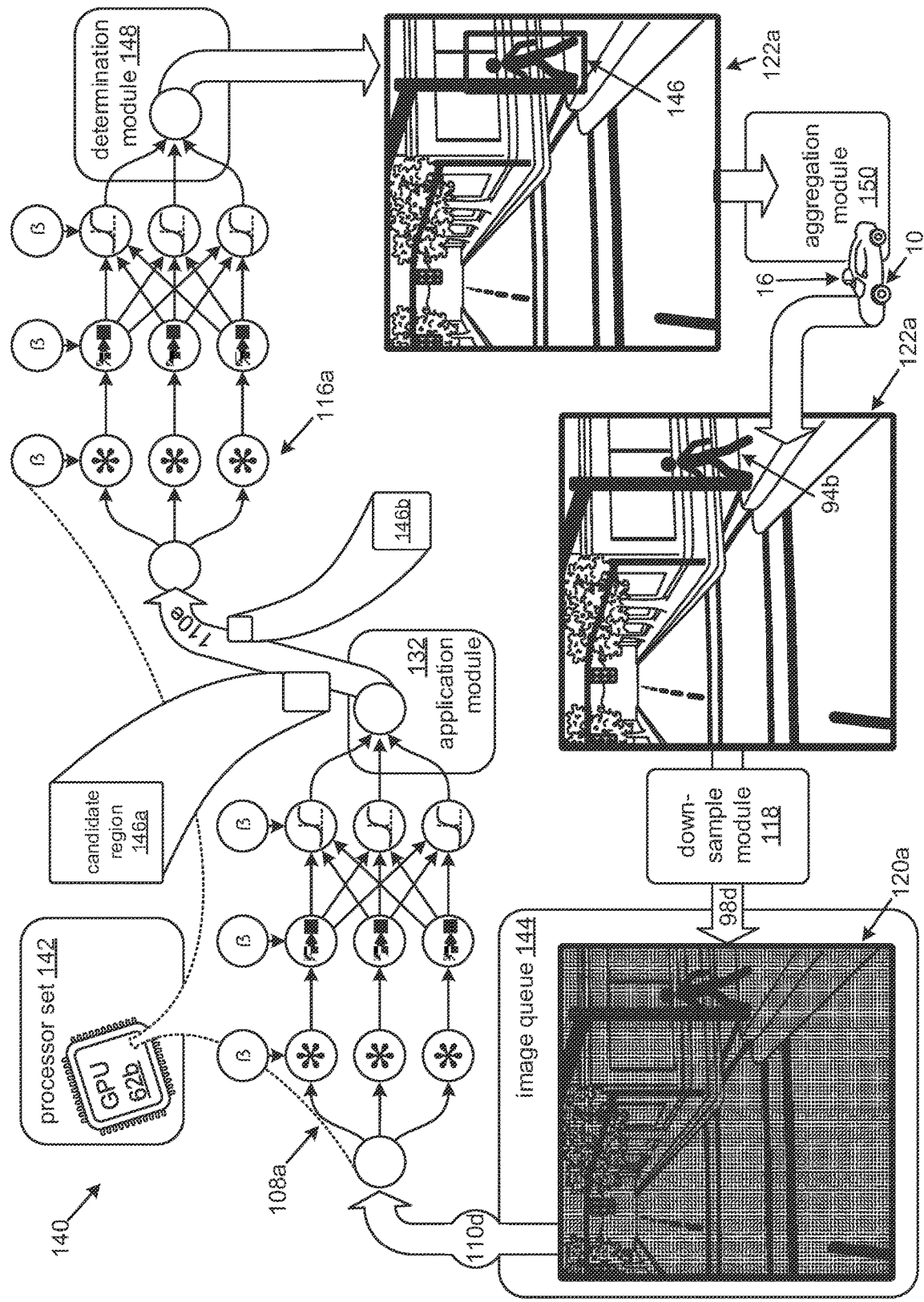
FIG. 9 is a schematic block diagram depicting a multi-stage image analysis system in which a low-fidelity classifier implementing a first CNN identifies candidate sections of a down-sampled image of a road scene as potentially depicting classified objects for confirmation by a high-fidelity classifier implementing a second CNN applied to high-fidelity versions of the candidate sections, resulting in the classification, detection, and locating of the depiction of the classified object in the road-scene image, in accordance with examples.

Referring to FIG. 9, a hierarchical, multi-stage, image-analysis system 140 is depicted. The image-analysis system 140 may include a low-fidelity classifier 108a followed by a high-fidelity classifier 116a. In some examples, the multi-stage-image-classification system 140 may include, together with both the low-fidelity classifier 108a and the high-fidelity classifier 116a on a processor set 142, a camera 16. In some examples, one or more GPUs 62b, may be included within the processor set 142, implementing the low-fidelity classifier 108a and/or the high-fidelity classifier 116a.

As discussed with respect to the first figure, a camera 16 operable to be mounted on an automobile 10 may be so mounted to capture a series road-scene images 122. Such a camera 16 may capture the series of images 122 of oncoming road-scenes at a frame rate satisfying a predefined threshold. The predefined threshold may include any of the examples discussed above with respect to FIG. 1.

Additionally, the system 140 may include an image queue 144, which may be implemented, without limitation, as a set of buffers, operable to sequentially queue a series of images 122 of oncoming road-scenes captured by the camera 16. Also, in some examples, the system may include a down-sample module 118 operable to down sample 98d road-scene images 122 to low-resolution images/versions 120. In some examples, the image queue 144 may queue images 122 direct from the camera 16. In other examples, such as the example depicted in FIG. 9, the image queue 144 may store down-sampled versions 120 of the images 122. Additionally, some examples may provide a portion of the image queue 144 for images 122 direct from the camera 16 and another portion for down sampled versions 120.

Once a down-sampled version 120b of a road-scene image 122a, or portion 124a thereof, is forward fed 110d through the low-fidelity classifier 108a, the low-fidelity classifier 108a may select one or more probable zones 146a-n from the set of overlapping zones, abstracted/extracted by the window module 130 and/or aggregation module 132.

The low-fidelity classifier 108a, which may be implemented with a first Convolution Neural Network (CNN) 20a, may be trained, or operable to be trained on the first dataset 82a, to classify, relative to the label set 102a, one or more sections 144 from the set of overlapping sections 126a-n spanning a down-sampled version 120, or portion thereof 124, of a road-scene image 122. Consequently, low-fidelity classifier 108a may select the one or more probable zones 146a-n for which the low-fidelity classifier 108a indicates a probability of a presence of an object 94 pertaining to a class of objects classifiable by the low-fidelity classifier 108b. In some examples, the application module 132 may be operable to note a set of potential sections 146a-n in which the low-fidelity classifier 108a identifies potential depictions of objects 94 classifiable according to the label set 102a. In examples for which the low-fidelity classifier 108a is trained for multiple sizes, or scales, the low-fidelity classifier 108a may select a scaled zone 146n from the set of scaled zones for which the low-fidelity classifier 108a indicates a probability of an existence of a scaled object 94 classifiable by the low-fidelity classifier 108a.

The multi-stage system 140 may then forward feed 110e the one or more probable zones 1446a-n, or candidate regions 146a-n selected by the low-fidelity classifier 108a through the high-fidelity classifier 116a. Where applying the sector candidates 146a-n to the high-fidelity classifier 116a, which may be implemented with a second CNN 20, indicates the presence of one or more classifiable objects 94 in one or more of the sector candidates 146a-n, the high-fidelity classifier 116a may confirm the presence of the one or more objects 94. In examples where the candidate regions 146a-n include multiple sizes/scales and/or the high-fidelity classifier 116a is trained for multiple sizes/scales, the high-fidelity classifier 116a may confirm the existence of a scaled object 94, where applying 110e the candidate scaled sector 146n results in a probability of the existence of the scaled object 94. A determination module 148 may be included in some examples, which may be operable to determine a confirmed set of areas by applying the high-fidelity classifier 116a to the set of candidate areas 146a-n.

The multi-stage system 140 may be hierarchical, such that the low-fidelity classifier 108a first selects candidate regions 146a-n before the candidate regions 146a-n are applied to the high-fidelity classifier 116a. However, in some examples, where the low-fidelity classifier 108a has found at least one candidate zone 146, the low-fidelity classifier 108a may continue searching zones 126 in the set of overlapping zones to which the low-fidelity classifier 108a has yet to be applied for one or more additional candidate zones 146. At the same time, the high-fidelity classifier 116a may simultaneously confirm the presence, or depiction, of one or more objects 94 by applying one or more sectors corresponding to the at least one candidate zone 146 found previously to the high-fidelity classifier 116a.

Additionally, the image-analysis system 140, may be operable for processing the series of images, by applying the foregoing teachings on individual images 122 in the series of images, at a processing-rate also satisfying the predefined threshold. As discussed, the predefined threshold may be set to provide sufficient time for a pre-determined assisted and/or autonomous response by the automobile 10 to classification information in the series of images. Parameters of one of or both of the low-fidelity classifier 108a and the high-fidelity classifier 116a may be set to limit computation requirements of the low-fidelity classifier 108a and/or the high-fidelity classifier 116a, relative to computing capabilities of the at least one GPU 62b and/or processor set 142.

Such parameters may include, without limitation, a number of convolution layers 26, the depth of one or more convolution layers 26, the dimensions of filters 46 applied at individual convolution neurons/nodes 36, the number of hidden layers 54, the depth of one or more hidden layers 54, the depth of the output layer 58, and/or other such parameters. These parameters may be controlled to enable processing the series of images at a predetermined rate providing real-time access to classification information in the series of images. In such examples, the GPU set 62b, in the set of processors 142, may implement the first and/or second CNNs 20 to capitalize on parallel processing capabilities of the GPU 62b. Again such capabilities may enable the first and/or second CNNs 20 to process the series of road-scene images at a rate providing time for a predetermined, assisted and/or autonomous-vehicle response to classification information in the series of road-scene images as processed.

In some examples, the classification, detection, and/or location information in the series of road-scene images 122 provided by the multi-stage system 140 may be utilized by itself for assisted and/or autonomous driving applications. In other examples, the classification, detection, and/or location information provided by the multi-stage system 140 may be combined with information from one or more additional instruments, discussed above in relation to FIG. 1, for assisted and/or autonomous driving applications. In such examples, an aggregation module 150, implemented on the processor set 142, or some other processor set, may be utilized. The aggregation module 150 may be operable to apply the low-fidelity classifier 108a with an exhaustive coverage of the down-sampled version(s) 120 of the image 122 from the camera 16, as applied to the region set, to provide redundancy to information from another imaging subsystem, such as a RADAR subsystem 12 and/or a LIDAR subsystem 14. Additionally, and/or in the alternative, the information from the multi-stage system 140 may supply missing classification, detection, and/or location information absent from classification information provided by another imaging subsystem, and/or improve the statistical reliability of the same.

Figure 10:
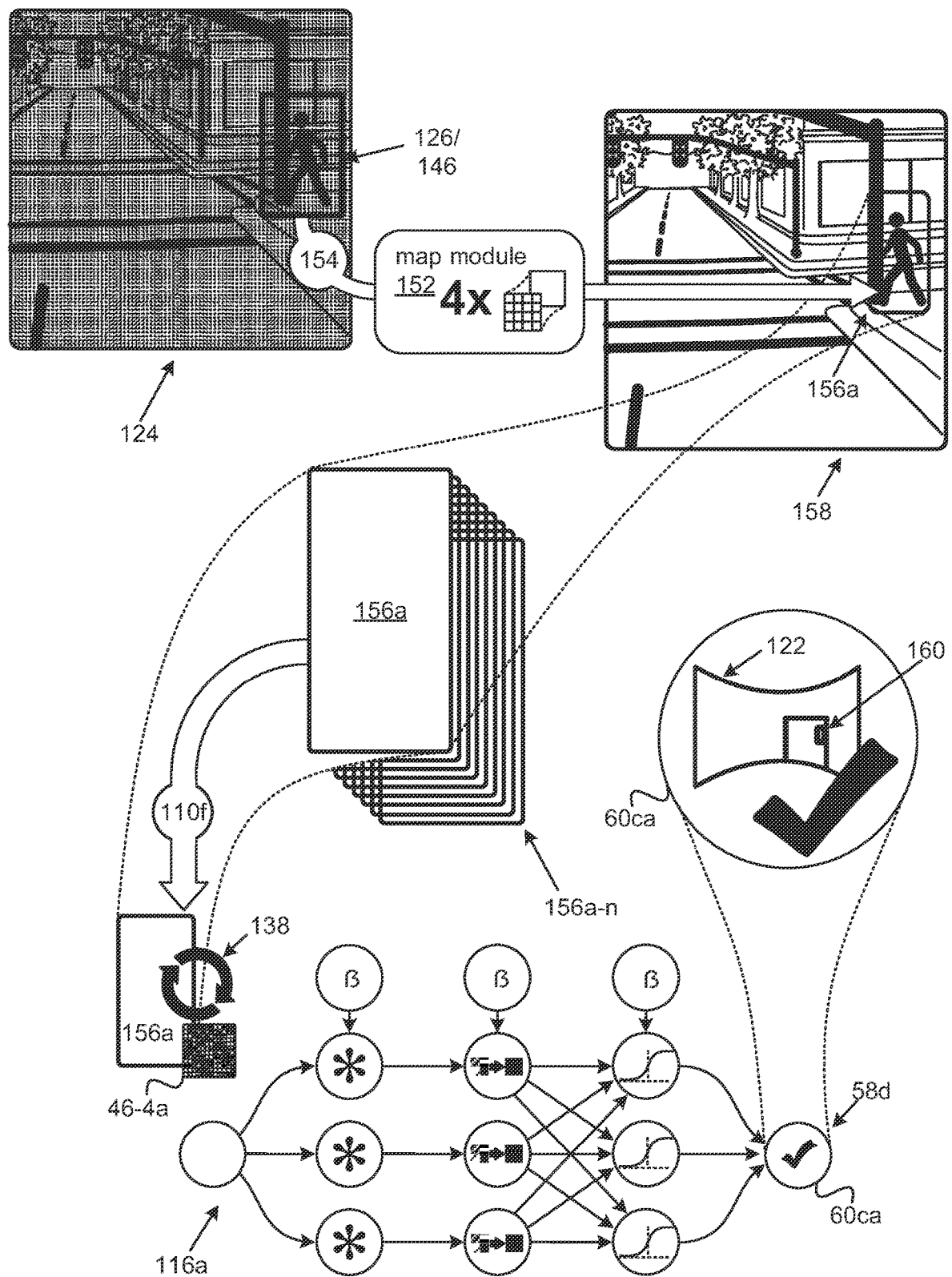
FIG. 10 is a schematic block diagram depicting a map module operable to map a section from a down-sampled image of a road-scene to a corresponding sector in a high-fidelity version of the image; in accordance with examples.

Referring to FIG. 10, additional infrastructure that may be relied upon to interface the low-fidelity classifier 108a and the high-fidelity classifier 116a in the multi-stage system 140 is depicted. Such infrastructure may be utilized to overcome the disparate resolutions for which the low-fidelity classifier 108a and the high-fidelity classifier 116a may be trained. Such infrastructure may include a map module 152. The map module 152 may be operable to map 154 a probable zone 146 selected from the down-sampled version 120, or portion 124a thereof, to a sector 156a, also referred to herein as a patch 156a and/or area 156a, of a higher-resolution version of the image 122, or a portion 158 thereof. Many different approaches to mapping 154 may be employed, such as, without limitation, taking into account the position of a sliding window 128 when it extracted the corresponding candidate region 146 and multiplying its position in multiple dimension by the down sampling factor.

Where the multi-stage system 140 is trained for different sizes/scales, the mapping module 152 may map 154 a scaled zone 126 in the down-sampled version 120, or portion 124 thereof, to a scaled sector 156 of the higher-resolution version 122. In some examples, the determination module 148, introduced with respect to the previous figure, may be operable to project the set of potential sections 146 on a high-fidelity version of the road-scene image 122 to create a set of candidate areas that may be forward fed 110 through the high-fidelity classifier 116a.

By way of example, a particular sector 156a depicting a classifiable object 94b of a pedestrian 70 may be forward fed 110f through the high-fidelity classifier 116a, with the corresponding convolutions 138 with filters 46 and other operations. At the output layer 58d, a node 60ca trained to provide a probability that a sector 156a depicts a classifiable object 94b may cross a threshold value indicating the detection, indicated by the check symbol. The particular node 60ca in the output layer 58d in which the detection is made may be used to provide classification information, i.e., that the detected object 94b is pedestrian 70, which may be the class assigned to the particular output node 60ac. Furthermore, the same information used to map 154 the section 126 to the particular sector 154a may be used to determine the location 160 of the depicted object 94b, or pedestrian 70, in the original image 122.

Figure 11:
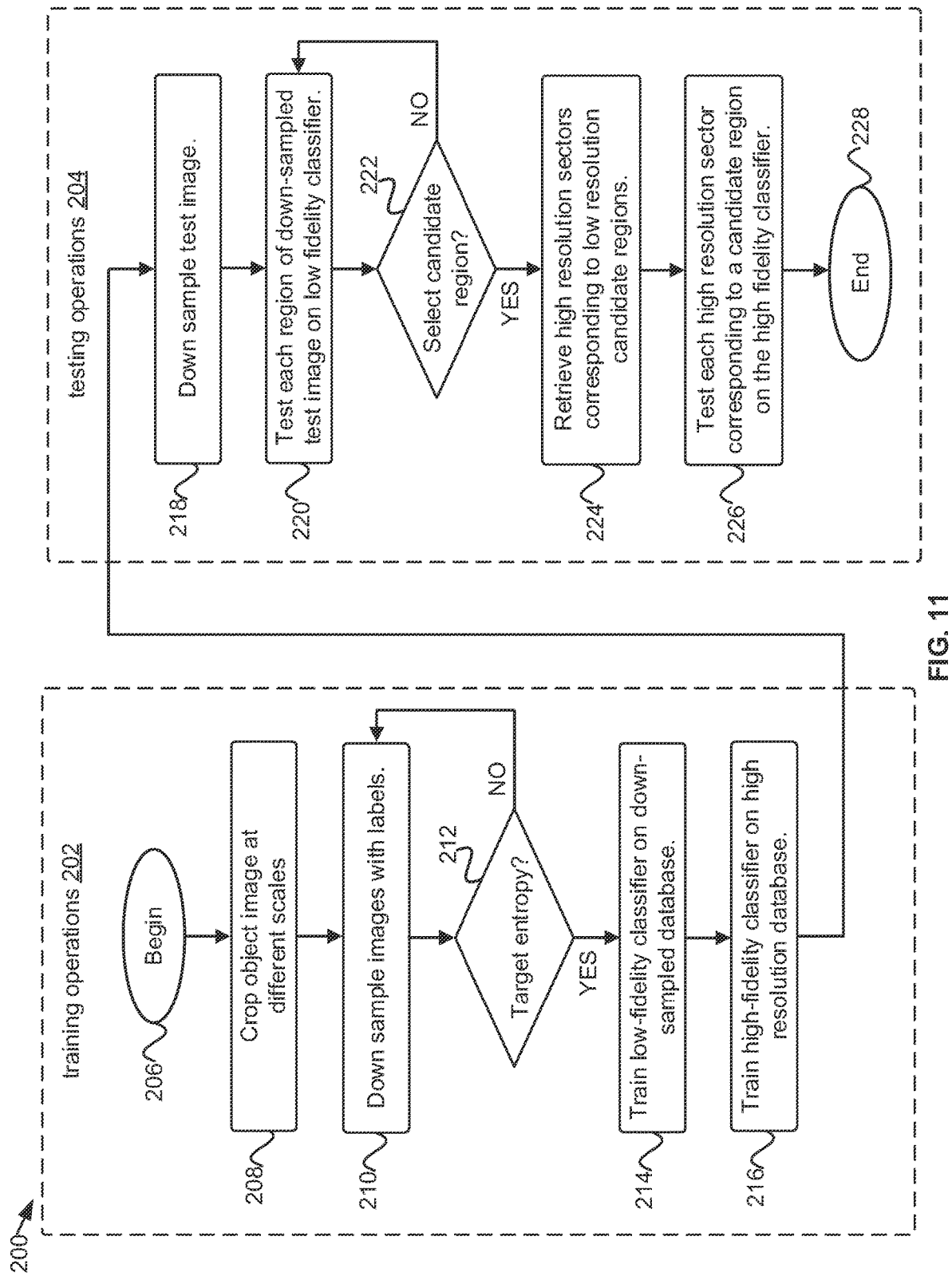
FIG. 11 is a flow chart of steps for quick, accurate, and comprehensive classification, detection, and locating of objects in images by a multi-stage image analysis system built on a low-fidelity classifier and a high-fidelity classifier, implementing a pair of CNNs, in accordance with examples.

Referring to FIG. 11, a flow chart 200 depicts steps for quick, accurate, and comprehensive classification, detection, and/or locating of classifiable objects 94 in images 122 by a multi-stage image analysis system 140. Such a system 140 may be built with a low-fidelity classifier 108a and a high-fidelity classifier 116a that may be built around a pair of CNNs 20. The flowchart illustrates the architecture, functionality, and/or operation of possible implementations of systems, methods, and computer program products according to examples. In this regard, each block in the flowchart may represent a module, segment, or portion of code, which comprises one or more executable instructions for implementing the specified logical function(s). It will also be noted that each block of the flowchart illustrations, and combinations of blocks in the flowchart illustrations, may be implemented by special-purpose, hardware-based systems that perform the specified functions or acts, or combinations of special-purpose hardware and computer instructions.

Where computer program instructions are involved, these instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block or blocks. These computer program instructions may also be stored in a computer readable medium that may direct a computer to function in a particular manner, such that the instructions stored in the computer-readable medium produce an article of manufacture including instruction means which implement the function/act specified in the flowchart and/or block or blocks.

It should also be noted that, in some alternative implementations, the functions noted in the blocks may occur out of the order noted. In certain embodiments, two blocks shown in succession may, in fact, be executed substantially concurrently, or the blocks may sometimes be executed in the reverse order, depending upon the functionality involved. Alternatively, certain steps or functions may be omitted.

Operations in methods 200 consistent with FIG. 11, may be grouped as training operations 202 and testing operations 204. Some examples may simply involve the training operations 202, others just the testing operations 204, while still other examples may involve both 202, 204. In examples involving both 202, 204, such methods 200 may begin 206 by cropping 208 images 88 of one or more different objects 94 at one or more different scales. The cropped images 88 may then be down sampled 210 with corresponding labels 100 attached.

A determination 212 may be made as to whether or not the entropies of the down sampled versions 86 have been reduced to a predetermined value and/or ratio relative to the original images 88. If the answer is no, methods 200 may return to further down-sample 210 one or more of the previously down-sampled versions 86. If the answer is yes, methods 200 may proceed by training 214 a low-fidelity classifier 108a on the resultant down-sampled dataset 82a of down sampled images/versions 86. Additionally, a high-fidelity classifier 116a may be trained 216 on a high resolution dataset 82b, which may be made up of the original, cropped images 88.

Methods 200 may proceed to the testing operations 204 by down sampling 218 a test image 122. Each region 126 of the down sampled test image 120 may be tested on the low-fidelity classifier 108a as a window 128 with dimensions commensurate to the regions 126 is slid 134 across the down sampled test image 120. A determination 222 may be made as to whether the low-fidelity classifier 108a has selected a candidate region 126 as potentially depicting a classifiable object 94. If the answer is no, methods 200 may continue to test additional regions 126 of the down-sampled version 102. However, if the answer is yes, methods may retrieve 224 one or more sectors 156 of the high resolution image 122 corresponding to the candidate regions 146. Each high-resolution sector 156 corresponding to a candidate region 146 may be tested 226 on the high-fidelity classifier 116a, which may or may not confirm the presence of depicted, classified objects 94, and the methods may end 228.

The present disclosures may be embodied in other specific forms without departing from their spirit or essential characteristics. The described examples are to be considered in all respects only as illustrative, not restrictive. The scope of the invention is, therefore, indicated by the appended claims, rather than by the foregoing description. All changes within the meaning and range of equivalency of the claims are to be embraced within their scope.

The invention claimed is:

1. A method comprising:
  calculating a maximum factor by which an input image can be down sampled while maintaining a ratio of entropy above a threshold level;
  down-sampling the input image to generate a down-sampled image, wherein the down-sampled image comprises the ratio of entropy above the threshold level;
  providing the down-sampled image to a low-fidelity classifier to identify a probable zone within the down-sampled image that satisfies a threshold probability for comprising an object; and
  forward feeding the probable zone to a high-fidelity classifier trained to confirm a presence of the object within the probable zone;
  wherein the low-fidelity classifier and the high-fidelity classifier are trained on different datasets.

2. The method of claim 1, further comprising sequentially queuing a series of images captured by a camera and processing the series of images to confirm the presence of one or more objects within any of the series of images, wherein processing the series of images comprises processing at a processing rate that satisfies a predefined threshold.

3. The method of claim 2, wherein the camera is secured to a vehicle and configured to capture a scene around the vehicle, and wherein the predefined threshold for the processing rate enables real time image analysis for analyzing the scene around the vehicle.

4. The method of claim 1, further comprising extracting a set of overlapping zones covering the down-sampled image, as definable by a sliding window with dimensions equal to dimensions of the set of overlapping zones.

5. The method of claim 1, further comprising extracting a plurality of probable zones from the down-sampled image by sliding a window over the down-sampled image pixel-by-pixel such that each probable zone of the plurality of probable zones is the size of the window and overlaps surrounding probable zones.

6. The method of claim 1, wherein the image is of a scene surrounding a vehicle and wherein the method further comprises:
    determining whether the object exists in the scene surrounding the vehicle based on whether the presence of the object is confirmed by the classifier;
    determining a driving maneuver for the vehicle based on whether the object exists in the scene surrounding the vehicle; and
    providing the driving maneuver to an automated driving system of the vehicle to be executed by the automated driving system.

7. The method of claim 1, further comprising:
    cropping each of a plurality of images that are labeled as comprising the object;
    down-sampling each of the plurality of images to generate a down-sampled set of images;
    training a low-fidelity classifier of a neural network with the down-sampled set of images; and
    training a high-fidelity classifier of the neural network with at least one of the plurality of images at full resolution.

8. The method of claim 1, further comprising mapping the probable zone of the down-sampled image to a patch within the input image, wherein the input image comprises a higher resolution version of the down-sampled image.

9. The method of claim 1, wherein the low-fidelity classifier is a convolutional neural network, and the high-fidelity classifier is a convolutional neural network, and wherein the low-fidelity classifier feeds into the high-fidelity classifier and operates independently of the high-fidelity classifier.

10. The method of claim 1, wherein forward feeding the probable zone to the high-fidelity classifier comprises:
    mapping the probable zone to a patch in the input image, wherein the patch in the input image corresponds with the probable zone in the down-sampled image; and
    providing the patch to the high-fidelity classifier.

11. A system comprising:
    a vehicle;
    a camera affixed to the vehicle configured to capture an image of a scene surrounding the vehicle; and
    a processor in communication with the camera and programmable to execute instructions stored in non-transitory computer readable storage media, the instructions comprising:
        calculating a maximum factor by which an input image can be down sampled while maintaining a ratio of entropy above a threshold level;
        down-sampling the input image to generate a down-sampled image, wherein the down-sampled image comprises the ratio of entropy above the threshold level;
        providing the down-sampled image to a low-fidelity classifier to identify a probable zone within the down-sampled image that satisfies a threshold probability for comprising an object; and
        forward feeding the probable zone to a high-fidelity classifier trained to confirm a presence of the object within the probable zone;
    wherein the low-fidelity classifier and the high-fidelity classifier are trained on different datasets.

12. The system of claim 11, wherein the instructions further comprise sequentially queuing a series of images captured by a camera and processing the series of images to confirm the presence of one or more objects within any of the series of images, wherein processing the series of images comprises processing at a processing rate that satisfies a predefined threshold.

13. The system of claim 12, wherein the predefined threshold for the processing rate enables real time image analysis for analyzing the scene around the vehicle.

14. The system of claim 11, wherein the instructions further comprise extracting a set of overlapping zones covering the down-sampled image, as definable by a sliding window with dimensions equal to dimensions of the set of overlapping zones.

15. The system of claim 11, wherein the instructions further comprise extracting a plurality of probable zones from the down-sampled image by sliding a window over the down-sampled image pixel-by-pixel such that each probable zone of the plurality of probable zones is the size of the window and overlaps surrounding probable zones.

16. A processor that is programmable to execute instructions stored in non-transitory computer readable storage media, the instructions comprising:
    calculating a maximum factor by which an input image can be down sampled while maintaining a ratio of entropy above a threshold level;
    down-sampling the input image to generate a down-sampled image, wherein the down-sampled image comprises the ratio of entropy above the threshold level;
    providing the down-sampled image to a low-fidelity classifier to identify a probable zone within the down-sampled image that satisfies a threshold probability for comprising an object; and
    forward feeding the probable zone to a high-fidelity classifier trained to confirm a presence of the object within the probable zone;
    wherein the low-fidelity classifier and the high-fidelity classifier are trained on different datasets.

17. The processor of claim 16, wherein the image is of a scene surrounding a vehicle and wherein the instructions further comprise:
    determining whether the object exists in the scene surrounding the vehicle based on whether the presence of the object is confirmed by the classifier;
    determining a driving maneuver for the vehicle based on whether the object exists in the scene surrounding the vehicle; and
    providing the driving maneuver to an automated driving system of the vehicle to be executed by the automated driving system.

18. The processor of claim 16, wherein the instructions further comprise:
    cropping each of a plurality of images that are labeled as comprising the object;
    down-sampling each of the plurality of images to generate a down-sampled set of images;

training a low-fidelity classifier of a neural network with the down-sampled set of images; and training a high-fidelity classifier of the neural network with at least one of the plurality of images at full resolution.

19. The processor of claim 17, wherein the instructions further comprise extracting a plurality of probable zones from the down-sampled image by sliding a window over the down-sampled image pixel-by-pixel such that each probable zone of the plurality of probable zones is the size of the window and overlaps surrounding probable zones.

20. The processor of claim 16, wherein the instructions are such that forward feeding the probable zone to the high-fidelity classifier comprises:

mapping the probable zone to a patch in the input image, wherein the patch in the input image corresponds with the probable zone in the down-sampled image; and providing the patch to the high-fidelity classifier.

\* \* \* \* \*